US011993499B2

(12) United States Patent
Macdonnell

(10) Patent No.: US 11,993,499 B2
(45) Date of Patent: May 28, 2024

(54) BEVERAGE APPARATUS COMPRISING BEVERAGE HOLDER, BEVERAGE OPENER AND BEVERAGE RETAINING ASSEMBLY

(71) Applicant: Michael Anthony Macdonnell, Kelowna (CA)

(72) Inventor: Michael Anthony Macdonnell, Kelowna (CA)

( * ) Notice: Subject to any disclaimer, the term of this patent is extended or adjusted under 35 U.S.C. 154(b) by 121 days.

(21) Appl. No.: 17/184,732

(22) Filed: Feb. 25, 2021

(65) Prior Publication Data

US 2021/0284516 A1 Sep. 16, 2021

Related U.S. Application Data

(63) Continuation-in-part of application No. 29/758,823, filed on Nov. 18, 2020, now Pat. No. Des. 1,009,571.

(60) Provisional application No. 62/988,814, filed on Mar. 12, 2020.

(51) Int. Cl.
*A47J 41/00* (2006.01)
*A47G 23/02* (2006.01)
*B67B 7/16* (2006.01)

(52) U.S. Cl.
CPC ............ *B67B 7/16* (2013.01); *A47G 23/0241* (2013.01); *A47G 2023/0275* (2013.01)

(58) Field of Classification Search
CPC .. A47G 23/0241; B67B 7/16; B65D 23/0885; B65D 81/3876
USPC .............. 220/903, 592.16; 229/403; 215/395
See application file for complete search history.

(56) References Cited

U.S. PATENT DOCUMENTS

| | | | | | |
|---|---|---|---|---|---|
| 1,810,630 | A | | 6/1931 | Tapp | |
| 2,547,059 | A | | 4/1951 | William et al. | |
| 2,745,301 | A | | 5/1956 | Grunwald | |
| 3,236,126 | A | | 2/1966 | Martinmaas | |
| 3,285,455 | A | * | 11/1966 | Pewitt ................ | B65D 81/3879 215/393 |
| 3,591,031 | A | | 7/1971 | Komendowski | |

(Continued)

OTHER PUBLICATIONS

Web printout from www.brumate.com/products/hopsulator-twist-plum from WayBackMachine Search Engine and dated for Sep. 30, 2020.

(Continued)

*Primary Examiner* — John K Fristoe, Jr.
*Assistant Examiner* — Elizabeth J Volz
(74) *Attorney, Agent, or Firm* — Oyen Wiggs Green & Mutala LLP; Nicholas Garner

(57) ABSTRACT

The present invention relates to a beverage apparatus. The beverage apparatus includes a beverage holder. The beverage apparatus includes a beverage opener coupled to the beverage holder. The beverage opener includes a central portion and an annular member that extends about the central portion. The beverage opener is shaped to receive in part a bottle cap between the central portion and the annular member. The beverage opener is shaped to wedge a bottle cap between the central portion and the annular member.
There is additionally provided a beverage apparatus that includes a beverage holder and a beverage retaining assembly coupled thereto. The beverage retaining assembly includes an outer flange having one or more flange passageways. The one or more flange passageways are shaped to enable air from the interior of the beverage holder to exit therefrom as a beverage is inserted into the beverage holder.

20 Claims, 26 Drawing Sheets

(56) References Cited

U.S. PATENT DOCUMENTS

| | | | | |
|---|---|---|---|---|
| 4,163,374 | A * | 8/1979 | Moore | F25D 31/007 220/592.01 |
| 4,183,226 | A | 1/1980 | Moore | |
| 4,433,597 | A | 2/1984 | Rowland | |
| 4,596,370 | A | 6/1986 | Adkins | |
| D286,604 | S | 11/1986 | Bierlein et al. | |
| 4,798,300 | A | 1/1989 | Ghosh et al. | |
| 4,964,600 | A | 10/1990 | Lee | |
| 5,150,869 | A | 9/1992 | Gould et al. | |
| D367,413 | S | 2/1996 | Ballin | |
| D373,290 | S | 9/1996 | Ballin | |
| 6,062,380 | A | 5/2000 | Dorney | |
| 6,318,573 | B1 | 11/2001 | Montero | |
| 6,626,326 | B2 | 6/2003 | Murakami | |
| D506,910 | S | 7/2005 | Tham-itthisak | |
| 7,404,345 | B1 | 7/2008 | Dipprey | |
| D601,862 | S | 10/2009 | Welch | |
| 7,685,908 | B1 | 3/2010 | Sebastian et al. | |
| 8,245,600 | B2 | 8/2012 | Beard | |
| D675,881 | S | 2/2013 | Wamack, Jr. | |
| D735,033 | S | 7/2015 | Lynd et al. | |
| 9,120,659 | B2 | 9/2015 | Bailey | |
| 9,156,668 | B1 | 10/2015 | Lindsey | |
| D752,397 | S | 3/2016 | Seiders et al. | |
| D773,296 | S | 12/2016 | Lynd et al. | |
| 9,555,949 | B1 * | 1/2017 | French | F25D 3/08 |
| D779,285 | S | 2/2017 | Seiders et al. | |
| D780,531 | S | 3/2017 | Seiders et al. | |
| D780,533 | S | 3/2017 | Seiders et al. | |
| D786,025 | S | 5/2017 | Seiders et al. | |
| 9,988,202 | B2 | 6/2018 | Haas | |
| 10,005,608 | B1 | 6/2018 | Jacob | |
| D830,788 | S | 10/2018 | Petrillo et al. | |
| 10,457,471 | B2 | 10/2019 | Jacob | |
| D873,091 | S | 1/2020 | Jacobsen | |
| D873,092 | S | 1/2020 | Jacobsen | |
| D876,886 | S | 3/2020 | Sitwell et al. | |
| D888,505 | S | 6/2020 | Seiders et al. | |
| 10,723,540 | B2 | 7/2020 | Roberts | |
| 10,773,873 | B2 | 9/2020 | Callinan et al. | |
| D901,988 | S | 11/2020 | Jacobsen | |
| D902,665 | S | 11/2020 | Jacobsen | |
| D908,444 | S | 1/2021 | Pape | |
| 11,040,819 | B1 | 6/2021 | Frankcomb | |
| D928,529 | S | 8/2021 | Ben Susan | |
| D957,202 | S | 7/2022 | Frankcomb | |
| 11,672,381 | B2 * | 6/2023 | Ma | A47G 19/16 99/317 |
| 2002/0175169 | A1 | 11/2002 | Tham-itthisak | |
| 2006/0016294 | A1 | 1/2006 | McGrath et al. | |
| 2007/0012140 | A1 | 1/2007 | Howlett et al. | |
| 2008/0060479 | A1 | 3/2008 | Nelson | |
| 2009/0255941 | A1 | 10/2009 | Kuntz | |
| 2013/0334237 | A1 | 12/2013 | Priest | |
| 2015/0096324 | A1 | 4/2015 | Marchiori | |
| 2017/0137207 | A1 | 5/2017 | Machintosh et al. | |
| 2018/0242765 | A1 | 8/2018 | Rane et al. | |
| 2019/0225367 | A1 | 7/2019 | Dosanjh | |
| 2020/0015609 | A1 | 1/2020 | Rhodes | |
| 2020/0062488 | A1 | 2/2020 | Jacob | |
| 2020/0339327 | A1 * | 10/2020 | Jacob | B65D 43/0229 |
| 2020/0369445 | A1 | 11/2020 | Jacob | |
| 2021/0053743 | A1 | 2/2021 | Briggs | |

OTHER PUBLICATIONS

Online advertisement from Brumate for a Hopsulator Twist Plum product made public since at least as early as Oct. 15, 2020.

* cited by examiner

BEVERAGE APPARATUS COMPRISING BEVERAGE HOLDER, BEVERAGE OPENER AND BEVERAGE RETAINING ASSEMBLY

BACKGROUND OF THE INVENTION

Field of the Invention

The present invention relates to a beverage apparatus. In particular, the invention relates to a beverage apparatus comprising a beverage holder, a beverage opener and a beverage retaining assembly.

Description of the Related Art

U.S. Pat. No. 2,745,301 to Grunwald discloses a combination fluid container, cap remover and bottle opener. The container has a neck with a neck opening adapted to be closed by a crown cap. The container includes a body portion and a bottom. The bottom has a recessed portion with a crown cap remover therein. The recessed portion of the bottom has a bar integrally formed therein extending thereacross. The crown cap remover is mounted on the bar and disposed completely inside the recessed portion. The bar has a lower portion of dovetail shape cross-section with oppositely inclined sides. The crown cap remover is a hook having a channel base portion with sides clamped to the sides of the bar and a cap top rest with a channel base portion with sides clamped to the sides of the bar. The cap top rest is spaced from the hook on the bar. The hook and cap top rest are slidably mounted on the bar.

U.S. Pat. No. 1,810,630 to Tapp discloses a device including a container having a recess formed in the under side of the bottom. The device includes a cap removing member rigidly fastened to the bottom of the container. The cap removing member is provided with a pair of diametrically opposed openings of elliptical form disposed to form a diametral rib diminishing in width toward its medial portion. The bottom portion of the tumbler is arranged over the bottle cap in an inclined position so that a portion of the cap with project through one of the openings and the rib is placed in contact with the lower edge of the cap. The opposed edge portion of the opening is positioned on the top surface of the cap to provide a fulcrum. The tumbler and removing device are forced from the inclined to a vertical position so as to remove the cap from the upper rim of the bottle.

U.S. Pat. No. 5,150,869 to Gould et al. discloses a multi-functional coaster having a vessel-supporting platform. Extending from the periphery of the platform are one or more additional constructional features enabling the coaster to be used also as a bottle opener and/or a sealing lid for a beverage can and/or a can opening tab lifter. The bottle opening feature is formed by a radial flange of claw-like cross-section and an axial skirt on which is provided a sharp-edged radially outwardly projecting portion for engaging the rim of a bottle cap. The flange simultaneously provides means for assisting leverage of a can tab by inserting it between the tab and the roof of the can, or alternatively a flange may be provided on its own for that purpose. The sealing lid feature is provided by a radially inwardly projecting step on the skirt, which forms a recess for releasably and sealingly engaging the lip on the top of a beverage can. This feature may be provided on its own on the skirt or in conjunction with the bottle opening feature. The whole coaster can be easily and cheaply molded from plastic. Optionally, the part of the skirt forming the cap rim-engaging part of the bottle opener is provided by a metal insert.

BRIEF SUMMARY OF INVENTION

There may be a need for a novel vacuum insulated beverage holder capable of maintaining a bottles temperature and providing the functionality needed to pry a bottle cap off from any orientation on the base of the holder. There may also be a need for the system to be able to provide the structural integrity to retain a beverage as a liquid and open a beverage without a prior vessel in the holder. Finally, there may be a need for the system to extrude and prevent heat from entering the holder.

The present invention provides, and it is an object to provide, an improved beverage apparatus comprising a beverage holder and beverage opener.

There is accordingly provided a beverage apparatus according to one aspect. The beverage apparatus includes a beverage holder. The beverage apparatus includes a beverage opener coupled to the beverage holder. The beverage opener includes a central portion and an annular member that extends about the central portion. The beverage opener is shaped to receive in part a bottle cap between the central portion and the annular member. The beverage opener is shaped to wedge a bottle cap between the central portion and the annular member.

The central portion of the beverage opener is cone-shaped at least in part. The beverage apparatus may further include a magnetic disposed within the central portion of the beverage holder.

There is also provided a beverage opener accordingly to another aspect. The beverage opener includes a sleeve member. The sleeve member includes a radially inwardly extending annular flange. The beverage opener includes an end member spaced-apart from the annular flange and coupled to and extending radially inwards from the sleeve member. The beverage opener is shaped to wedge therein a bottle cap between the flange thereof and the end member thereof.

There is additionally provided a beverage apparatus according to a further aspect. The beverage apparatus includes a beverage holder having an interior. The beverage apparatus includes a beverage retaining assembly coupled to the beverage holder. The beverage retaining assembly includes an outer flange having one or more flange passageways. The one or more flange passageways are shaped to enable air from the interior of the beverage holder to exit therefrom as a beverage is inserted into the beverage holder.

BRIEF DESCRIPTION OF DRAWINGS

The invention will be more readily understood from the following description of preferred embodiments thereof given, by way of example only, with reference to the accompanying drawings, in which.

DESCRIPTION OF THE PREFERRED EMBODIMENTS

Figure 1:
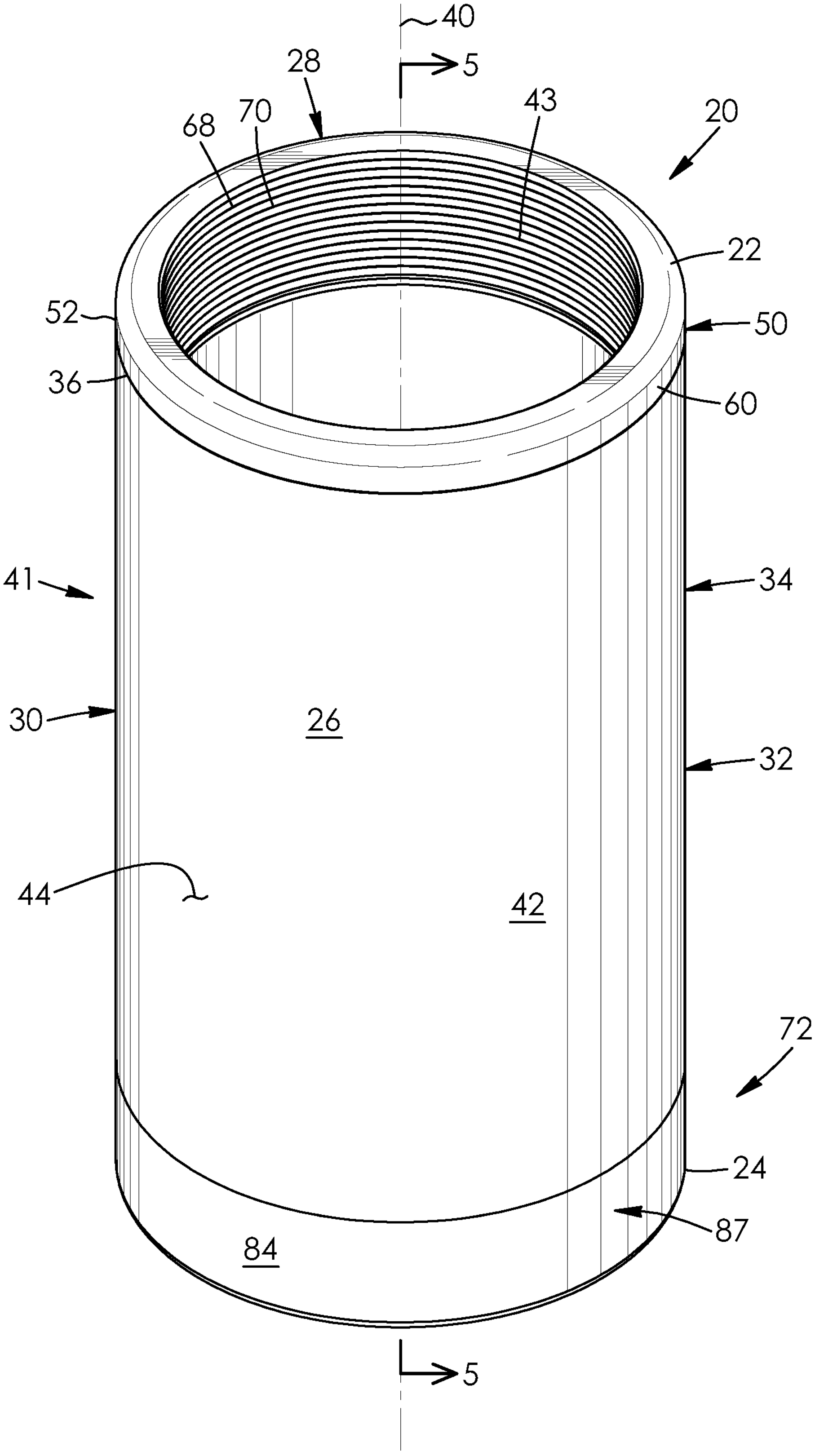
FIG. 1 is a top, front perspective view of the beverage apparatus according to a first aspect, the beverage apparatus including a beverage holder, a beverage opener and a beverage retaining assembly.

Referring to the drawings and first to FIG. 1, there is shown a beverage apparatus 20. The beverage apparatus has an open top 22, a bottom 24, a front 26, a rear 28 and a pair of sides 30 and 32. The front, rear and sides of the beverage apparatus 20 extend from the top to the bottom of the beverage apparatus. The beverage apparatus is generally holder and cylindrical in outer shape.

Figure 5:
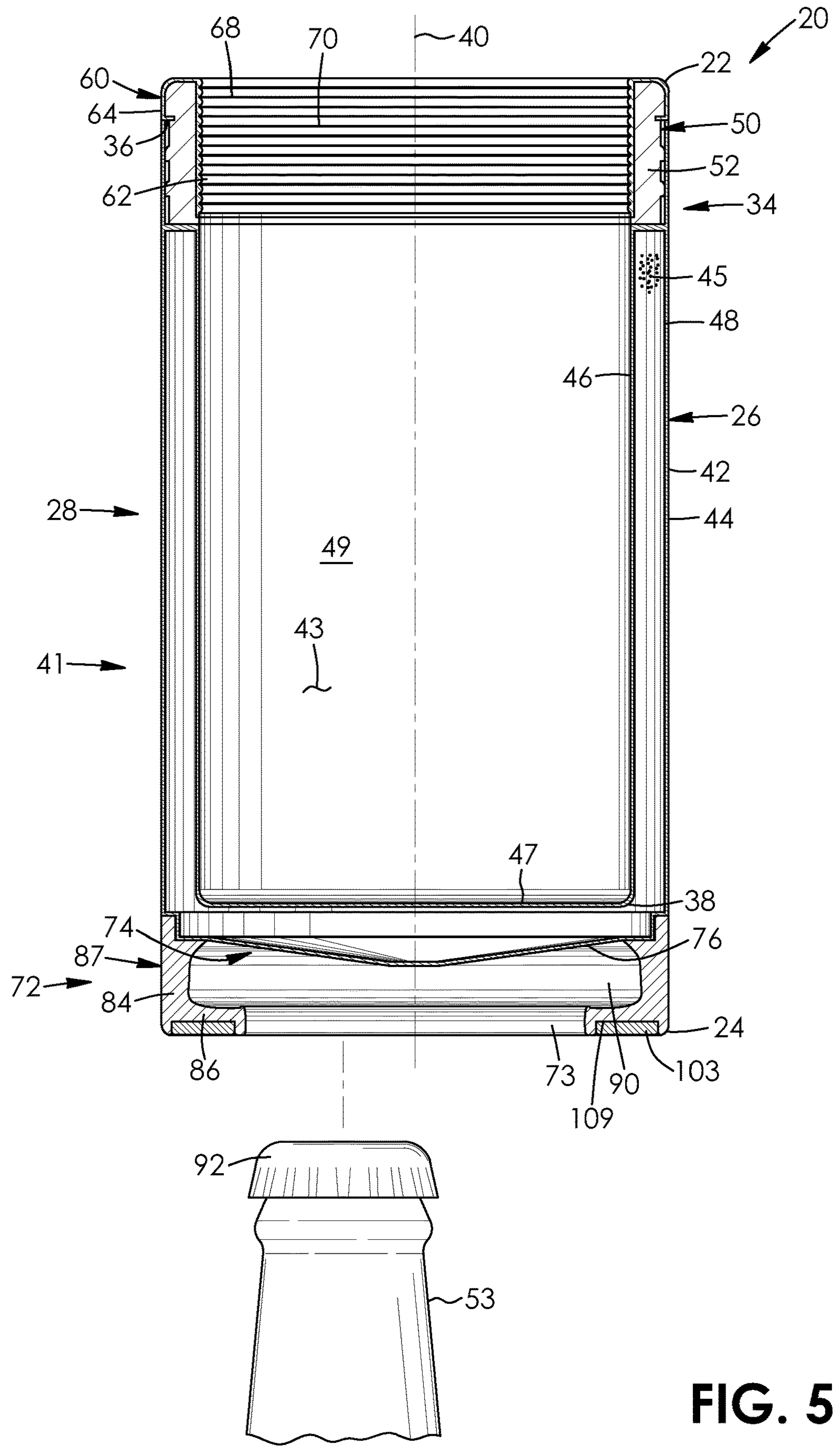
FIG. 5 is a sectional view taken along lines 5-5 of the beverage apparatus of FIG. 1, with a beverage in the process of being positioned adjacent to the beverage opener of the beverage apparatus, the beverage being shown in fragment.

Still referring to FIG. 1, the beverage apparatus 20 includes a beverage holder 34. As seen in FIG. 5, the beverage holder is generally tubular in shape in this example with an open top 36, a closed bottom 38 and a longitudinal axis 40 that extends between the top thereof and the bottom thereof. The top of the beverage holder coincides and aligns with the top 22 of the beverage apparatus 20. Referring back to FIG. 1, the beverage holder 34 includes an outer wall, in this example an annular outer wall 42 that extends from the top towards the bottom 24 of the beverage apparatus and extends about axis 40. The outer annular wall has an outer surface 44 that extends from the top 22 towards the bottom of the beverage apparatus 20. The outer surface of the outer annular wall of the beverage holder 34 faces and is in fluid communication with the exterior 41 of the beverage apparatus 20.

Figure 7:
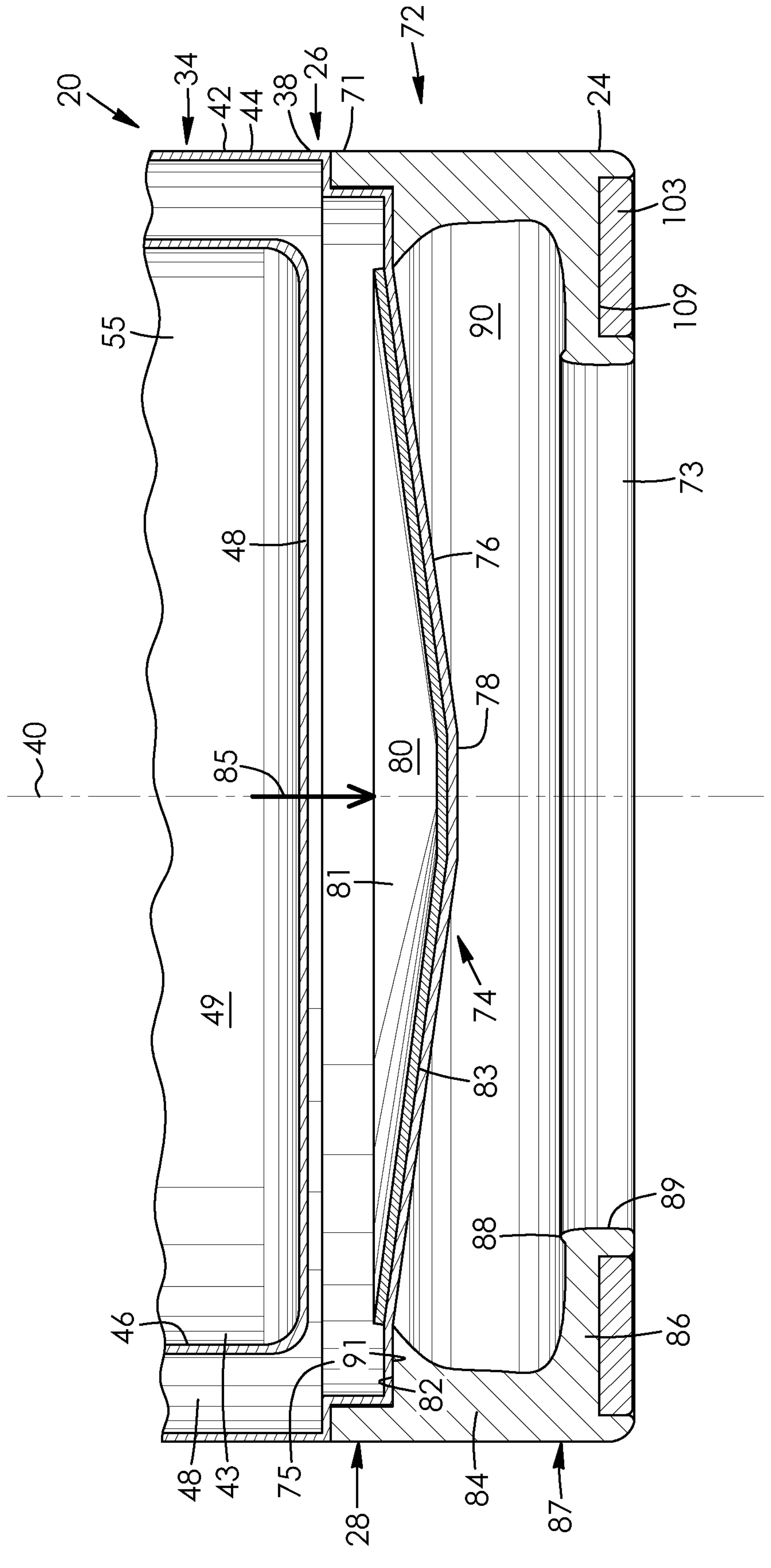
FIG. 7 is an enlarged sectional view similar to FIG. 5 of the beverage opener of the beverage apparatus of FIG. 1 coupled to the beverage holder of the beverage apparatus, with the beverage holder being shown in fragment.
Figure 8:
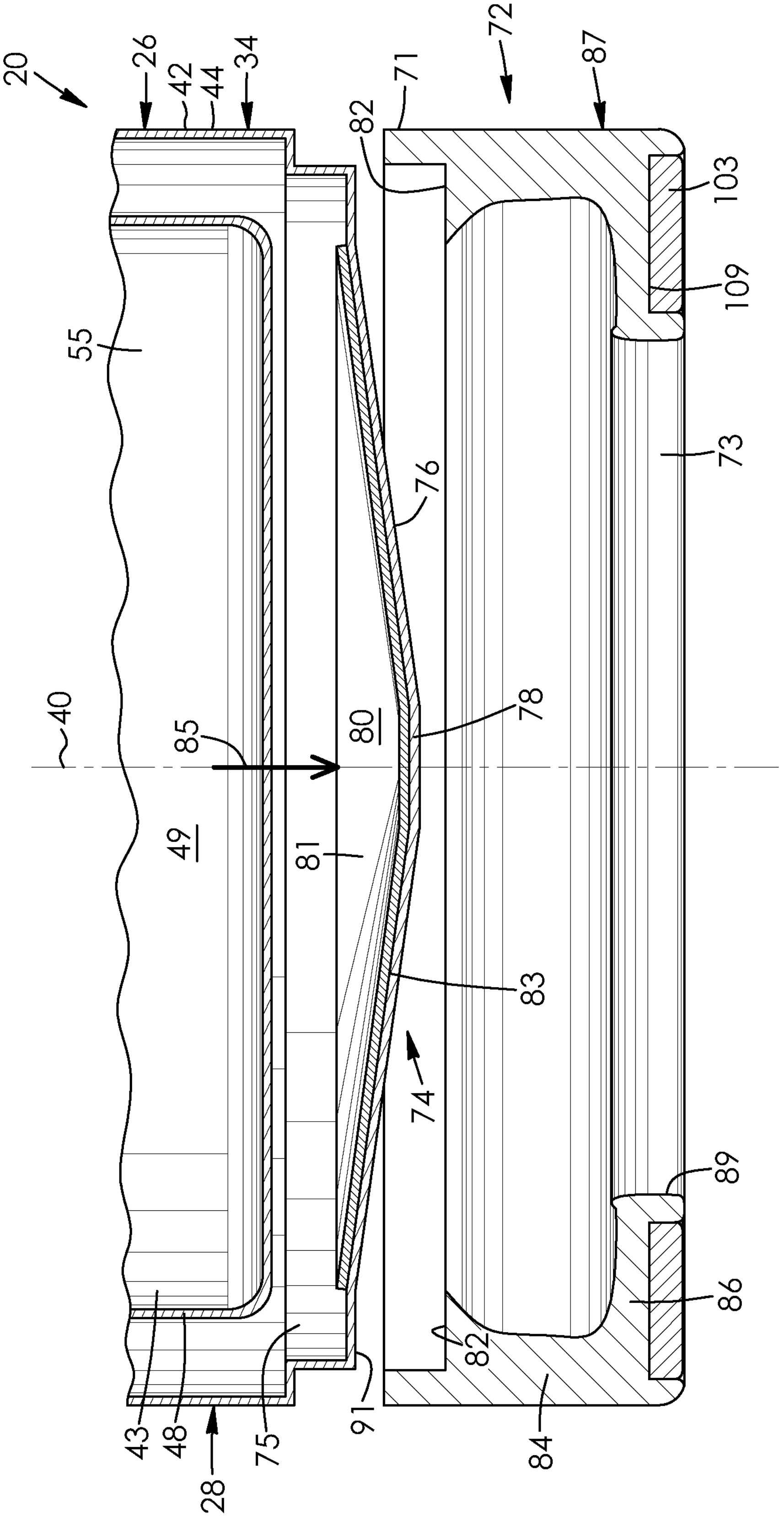
FIG. 8 is an enlarged sectional view of the beverage apparatus similar to FIG. 7, with the beverage opener of the beverage apparatus shown slightly spaced-apart from the beverage holder of the beverage apparatus and in the process of coupling with the same, and with the beverage holder being shown in fragment.
Figure 9:
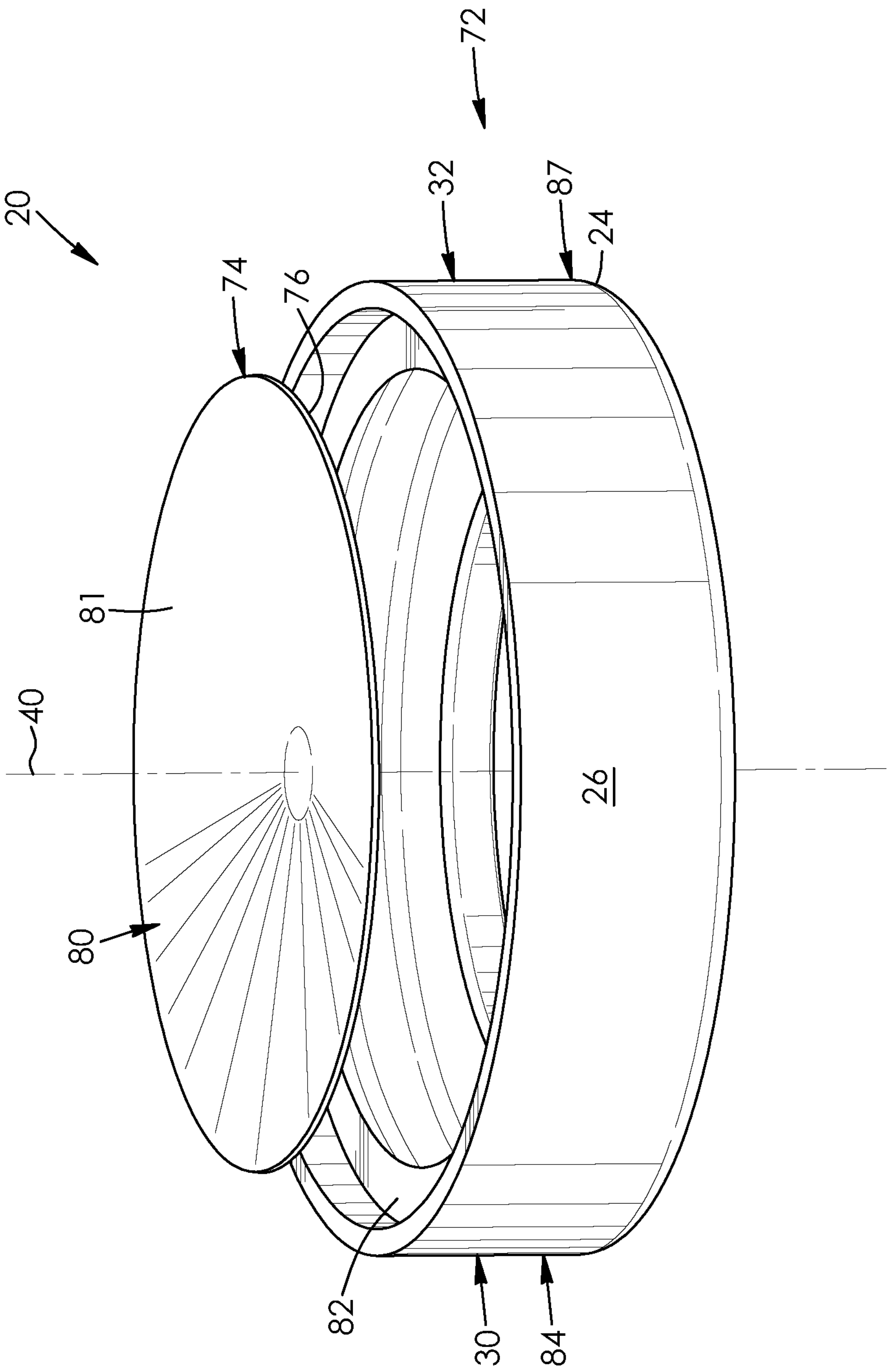
FIG. 9 is a top, front exploded perspective view of the beverage opener of the beverage apparatus of FIG. 1.

As seen in FIG. 5, the beverage holder 34 includes an inner wall, in this example an annular inner wall 46 that extends about axis 40. The inner wall is coaxial with and radially inwardly spaced-apart from outer wall 42. The inner wall 46 extends from the top 36 to the bottom 38 of the beverage holder 34. As seen in FIGS. 7 and 8, the beverage holder 34 includes a bottom wall 47 which is circular in this example and that couples to and is integrally formed with the inner wall. The bottom wall is adjacent the bottom 38 of the beverage holder 34. The inner wall 46 and bottom wall 47 of the beverage holder form a receptacle 49 for receiving a beverage, in this example the bottom, gripping portion 51 of a beverage, in this example beer bottle 53 seen in FIG. 6 containing beer therein. The beverage holder 34 has an interior 43 shaped to at least partially receive the bottle therewithin. The bottle 53 is just one example of a bottled beverage and is not intended to be limiting or strictly required; other bottle-capped beverages may be used in other examples.

As seen in FIG. 5, the beverage holder 34 includes a first chamber, in this example an annular, sleeve-shaped chamber 48 that extends between the outer wall 42 and inner wall 46 of the beverage holder. The chamber is fully sealed and enclosed in this example and extends from the bottom 38 of the beverage holder 34 towards the top 36 of the beverage holder. The chamber 48 is filled with and contains within an insulating substance, in this example air 45; however this is not strictly required and other insulating substances or materials may be used in other embodiments.

Figure 3:
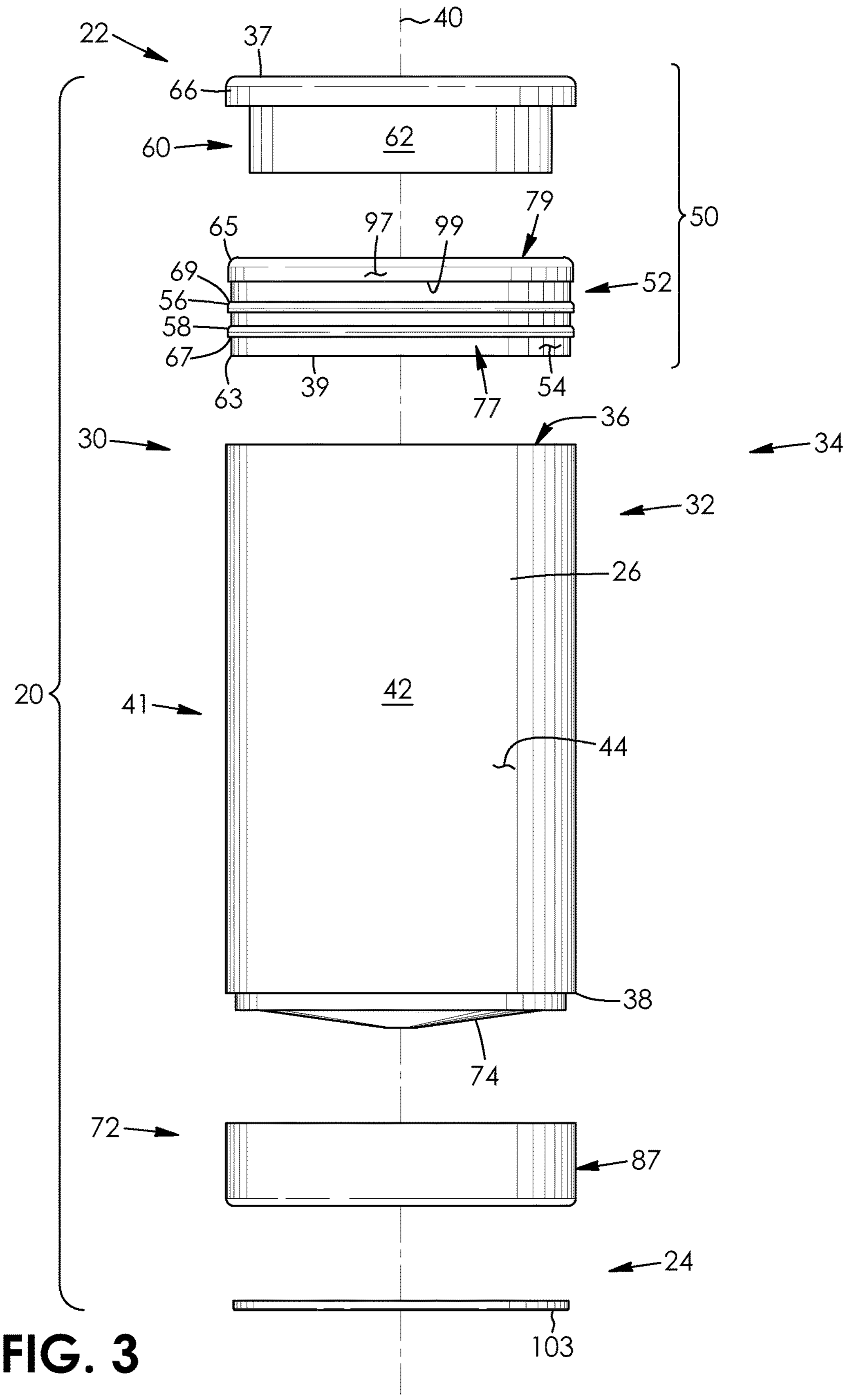
FIG. 3 is an exploded front elevation view of the beverage apparatus of FIG. 1.

As seen in FIG. 3, the beverage apparatus 20 includes a beverage retaining assembly 50. The beverage retaining assembly includes a first member, in this example a first or outer annular member 52 having an outer peripheral surface, in this example an outer annular surface 54. The outer annular surface of the outer annular member may be referred to as the outer peripheral surface or outer annular surface of the beverage retaining assembly 50. Outer annular member 52 is made of a semi-rigid or rigid polymer, in this example a thermoplastic or thermosetting polymer, in this case a plastic substrate. However, this is not strictly required and the outer annular member 52 may be made of other materials in other examples.

The outer annular member has an annular bottom 63 and an annular top 65 spaced-apart from the top thereof. The bottom of the outer annular member 52 corresponds to the bottom 39 of the beverage retaining assembly 50. The bottom of the beverage retaining assembly is spaced-apart from the top 37 of the beverage retaining assembly, which corresponds to top 22 of the beverage apparatus 20. The annular surface 54 of the outer annular member 52 extends from the bottom thereof towards the top thereof. The outer annular member includes an inner sleeve 77 that extends from the bottom 63 thereof towards the top 65 thereof. The inner sleeve may be referred to as the sleeve of the beverage retaining assembly 50 that extends from the bottom 39 of the beverage retaining assembly towards the top 37 of the beverage retaining assembly.

The outer annular member 52 includes an annular flange, in this example an outer flange 79 coupled to, integrally formed with and extending radially outwards from the inner sleeve. The flange extends from the top 65 of the outer annular member 52 towards the bottom 63 of the outer annular member in this example. The flange 79 has an outer peripheral surface, in this example an annular surface 97. The outer annular member 52 has a shoulder 99 that is annular. The shoulder extends radially between the annular surface 97 of the flange 79 and inner sleeve 77.

The inner sleeve 77 of the outer annular member 52 has at least one, and in this example a pair of axially spaced-apart and circumferentially extending annular grooves 67 and 69 extending radially inwards from the annular surface 54 thereof. The grooves are positioned between the bottom 63 of the outer annular member 52 and the top 65 of the outer annular member.

Figure 4:
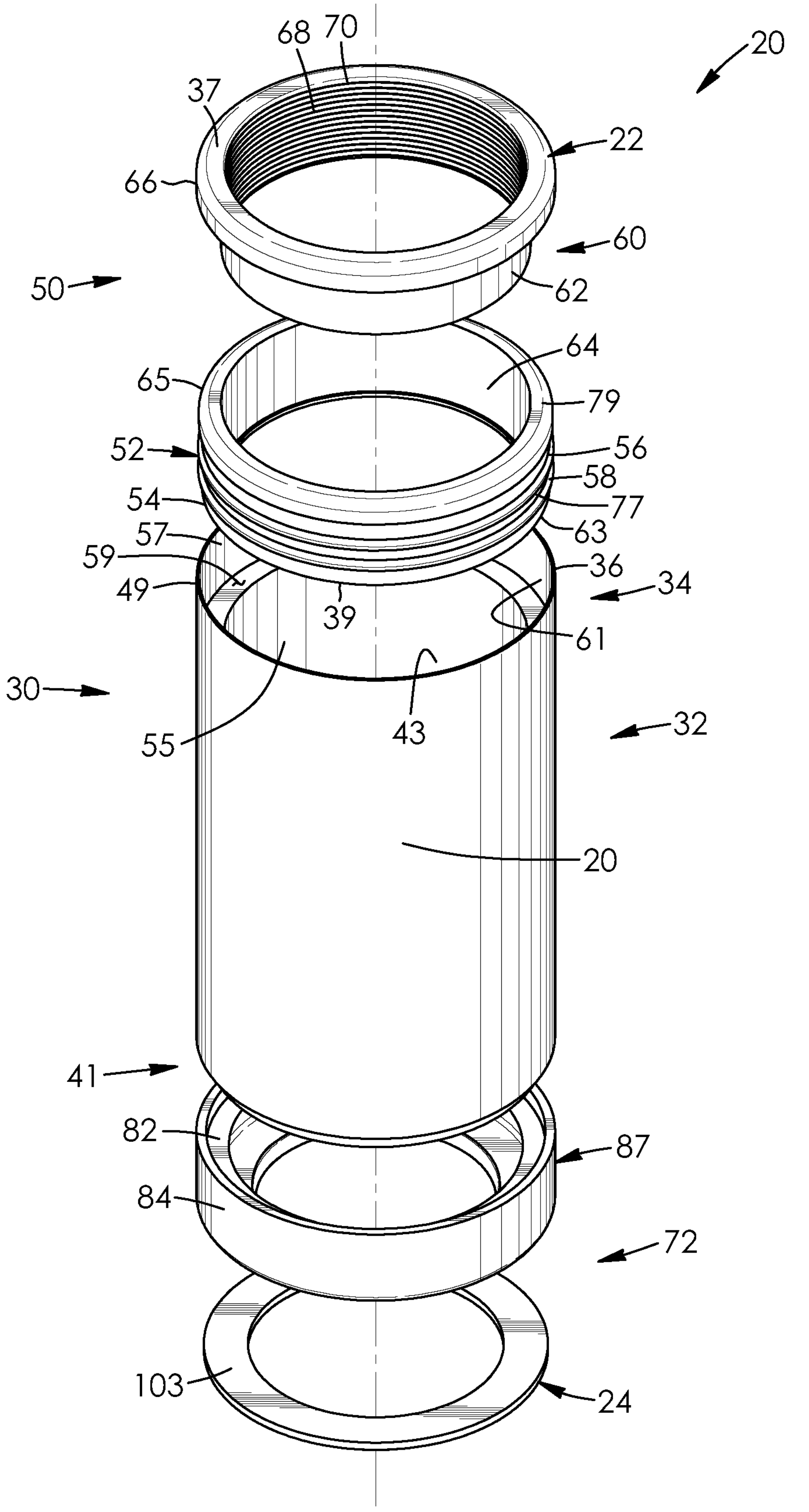
FIG. 4 is a top, front exploded perspective view of the beverage apparatus of FIG. 1.

The beverage apparatus 20 includes at least one, and in this example a pair of resilient members, in this case O-rings 56 and 58 shaped to be partially received within and retained by the grooves 67 and 69 of the outer annular member 52. The outer annular member 52 is shaped to fit within the open top 36 of the beverage holder 34 and snugly engage the beverage holder via the O-rings. As seen in FIG. 4, the beverage holder 34 has an inner bore 55, an outer bore 57 adjacent to the open top 36, and an annular shoulder or ledge 59 between the inner bore and outer bore. The ledge receives bottom 63 of the annular member 52 and positions O-rings 56 and 58 of the annular member 52 snugly abut inner wall portion 61 of the beverage holder facing outer bore 57, with the bottom 63 of the annular member abutting the top of the ledge. Inner wall portion 61 is smooth in this example. The beverage retainer assembly 50 thus couples to the open top 36 of the beverage holder 32. Flange 79 is shaped to abut the open top of the beverage holder via shoulder 99 thereof. Bottom 39 of the beverage retaining assembly 50 is thus shaped to fit within the beverage holder 34. Sleeve 77 of the outer annular member 52 of the beverage retaining assembly is thus shaped to fit within the open top 36 of and couple to the beverage holder 34.

As seen in FIG. 4, the beverage retaining assembly 50 includes in this example a second member, in this case an inner annular member 60. The inner annular member is made of a resilient member, in this example an elastomer, in this case silicone rubber. However, this is not strictly required and the inner annular member 60 may be made of other materials in other examples. The inner annular member includes a lower sleeve 62 that is received within bore 64 of and couples to the outer annular member 52. The inner annular member 60 includes a flange 66 that couples to and extends radially outwards from the sleeve thereof adjacent to the top 22 of the beverage apparatus 20. As seen in FIG. 5, the inner annular member has an inner peripheral surface, in this example an inner annular surface 68. The inner annular surface of the inner annular member 60 may be referred to as the inner peripheral surface or inner annular surface of the beverage retaining assembly 50. The inner annular member includes at least one resilient member, in this example one or more annular members, in this case a rubber lining 70 coupled to the inner annular surface 68 thereof and radially extending inwards from the inner annular surface thereof.

Figure 2:
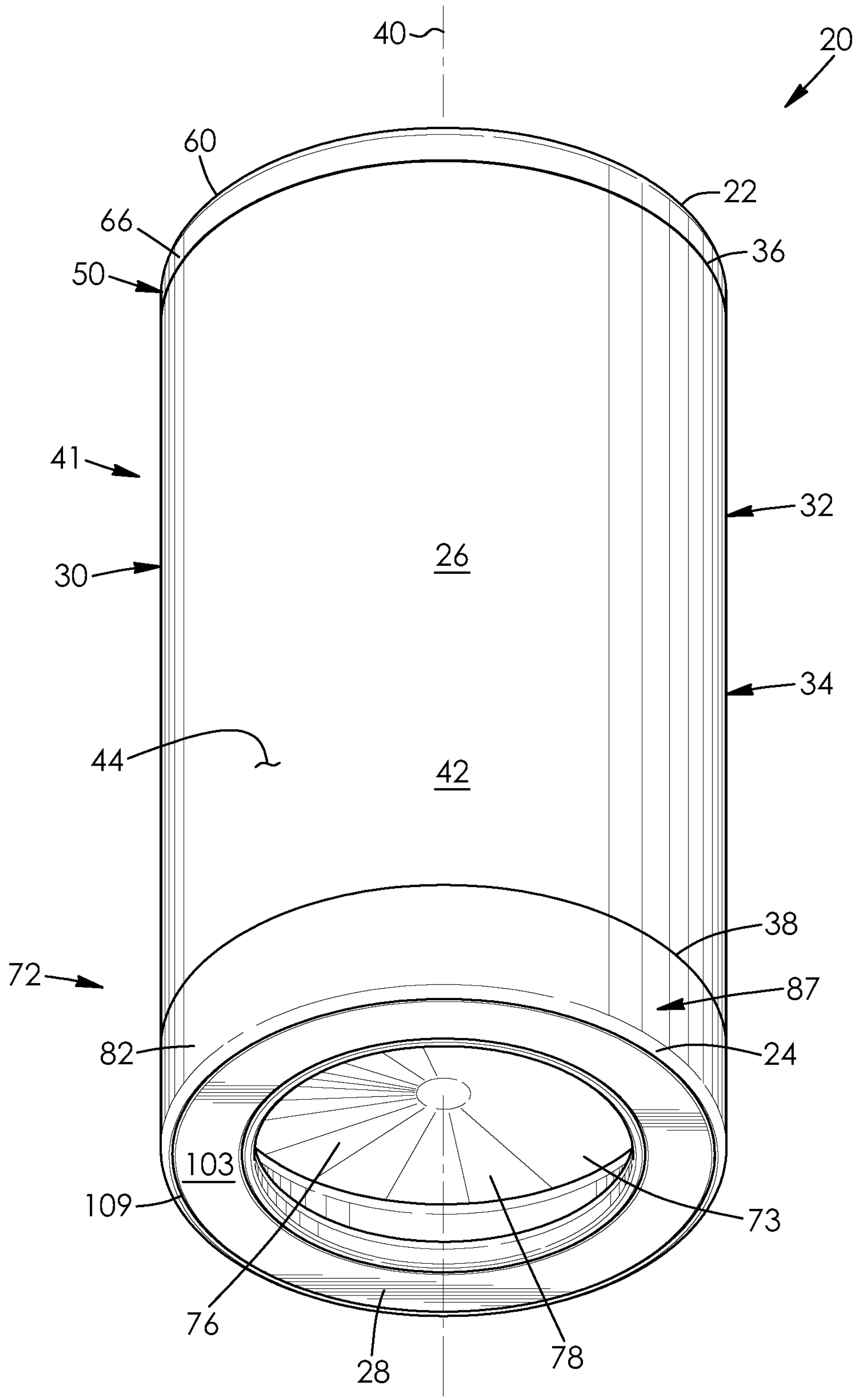
FIG. 2 is a bottom, front perspective view of the beverage apparatus of FIG. 1, showing the beverage opener of the beverage apparatus coupled to the bottom of the beverage holder of the beverage apparatus.

As seen in FIG. 2, the beverage apparatus 20 includes a beverage opener 72 coupled to and in this example integrally formed with the beverage holder 34. However, this is not strictly required and the beverage opener may couple to and comprise a separate part from the beverage holder in other embodiments. The beverage opener 72 is generally annular and disc-shaped in this example and comprises a member that is annular in this example, in this case an outer body 87. The outer body may be referred to as an annular member or a sleeve member. The outer body 87 of the beverage opener 72 couples to the bottom 38 of the beverage holder in this example. As seen in FIGS. 7 and 8, the beverage opener is generally annular in shape with a closed downwardly-extending top 71 and an open bottom 73 spaced-apart from the top thereof.

The outer body 87 of the beverage opener 72 includes a sleeve 84 that in this example is annular. The sleeve 84 is longitudinally-extending and extends from the top 71 of the beverage opener to the bottom 73 of the beverage opener. The sleeve of the outer body 87 of the beverage opener may be referred to as an annular member of the beverage opener 72.

The outer body 87 of the beverage opener includes a flange 86 extending along the bottom 73 thereof. The flange is integrally interconnected with the sleeve 84 of the outer body of the beverage opener so as to form a unitary whole in this example. The flange couples to and radially-inwardly extending relative to the sleeve 84 of the outer body 87 of the beverage opener 72. Flange 86 extends inwards relative to the outer surface 44 of the beverage holder 34. The flange is aligned with and adjacent to the bottom 24 of the beverage apparatus 20. As seen in FIGS. 7 and 8, the outer body 87 of the beverage opener 72 is L-shaped in cross-section. The beverage opener 72 includes a protruding member, in this example annular inner peripheral portion, in this case a lip 88 coupled to and extending axially upwards from distal or inner annular end 89 of flange 86. The lip is integrally interconnected with the flange of the beverage opener so as to form a unitary whole in this example. Alternatively, the lip 88 may be considered part of the flange 86, with the flange extending inwardly and upwardly at least in part.

As seen in FIG. 5, the beverage apparatus 20 in this example includes an insert 103 that is made of a resilient member in this case. The insert is annular, aligns along the bottom 24 of the beverage apparatus and is received with a bottom annular recess 109 of the flange 86.

As seen in FIG. 3, the beverage opener 72 includes a central portion 74. As seen in FIG. 7, the sleeve 84 of the beverage opener extends about and encloses the central portion 74 of the beverage opener. The central portion of the beverage opener 72 is coaxial with and spaced-apart from the sleeve of the beverage opener.

As seen in FIG. 5, the central portion of the beverage opener is spaced-apart below the bottom 38 of the beverage holder 34. As seen in FIGS. 7 and 8, the beverage apparatus 20 includes a second chamber, in this example a circular chamber 75 positioned between the bottom 38 and bottom wall 47 of the beverage holder and the central portion 74 of the beverage opener 72. The circular chamber is in fluid communication with sleeve-shaped chamber 48.

Still referring to FIGS. 7 and 8, the central portion 74 of the beverage opener 72 axially extends downwards and radially-inwards relative to the outer surface 44 of the beverage holder, in a direction 85 extending from chamber 75 towards the bottom 24 of the beverage apparatus 20. The central portion of the beverage opener is cone shaped at least in part, in this example. In this case, the central portion 74 of the beverage opener 72 is frustoconical in outer shape. The central portion of the beverage opener is hollow in this example, though this is not strictly required. The central portion 74 of the beverage opener 72 includes an outer wall 76 and which faces downwards in part and radially outwards in part from the perspective of FIGS. 7 and 8. The outer wall and/or central portion of the beverage opener may be referred to as an end member. The outer wall 76 is annular and tapers downwards in the direction 85 and from the perspective of FIGS. 7 and 8. The outer wall has an end portion 78 that is circular and co-axial with the axis 40 of the beverage apparatus 20 in this example. The end portion of the outer wall 76 of the central portion 74 of the beverage opener 72 is planar in this example.

Still referring to FIGS. 7 and 8, the beverage opener 72 includes a magnet 80 disposed within the central portion 74 of the beverage opener 72 in this example. The magnet has an open top 81 and has a generally frustoconical bottom 83 in this example. Alternatively, the central portion of the beverage opener may be magnetic at least in part.

As seen in FIG. 8, the beverage opener 72 includes a seat, in this example an annular shoulder 82 that couples to and extends radially inwards from the sleeve 84 thereof. The shoulder 82 is positioned near the top 71 of the beverage opener. The shoulder is shaped to receive the bottom 38 of the beverage holder 34 and the peripheral regions 91 of the outer wall 76 of central portion 74 of the beverage opener. As seen in FIGS. 7 and 8, the outer wall 76 of the central portion of the beverage opener 72 in this example faces in part in the direction of sleeve 84 of the beverage opener.

Referring to FIG. 7, the central portion 74 and outer body 87 of the beverage opener 72 form an annular channel 90. The channel is C-shaped in longitudinal cross-section in this example. The channel 90 is shaped to receive in part a bottle cap 92 seen in FIG. 10. The beverage opener 72 is shaped to receive in part, and in this example wedge the bottle cap between the wall 76 of the central portion 74 of the beverage opener 72 and the outer body 87 of the beverage opener. Lip 88 of the outer body of the beverage opener engages outer peripheral portion 94 of the bottle cap 92 adjacent to the bottom 96 of the bottle cap. Top 98 of the bottle cap abuts wall 76 at least in part. The radius of separation R between the inner annular end 89 of the flange 86 or lip 88 and end portion 78 of the outer wall 76 of the central portion 74 of the beverage opener 72 is shaped such that at least a portion of the planar top 98 of the bottle cap 92 abuts said end portion when removing the bottle cap from the beverage. Thus, the radius of separation is less than the outer diameter $D_O$ of the bottle cap in this example; however this is not strictly required and the radius of separation may comprise a different size in other embodiments.

Figure 10:
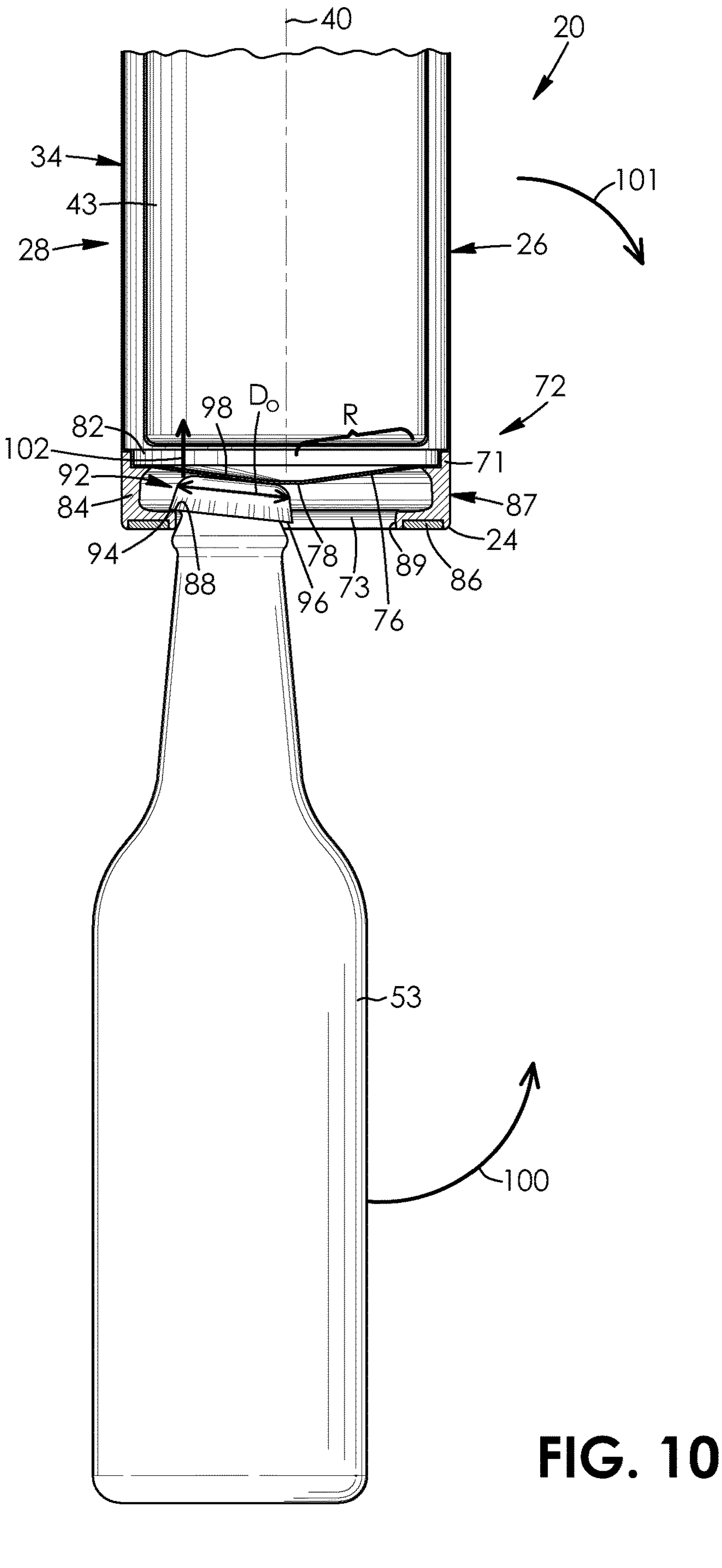
FIG. 10 is a sectional view taken along lines 5-5 of the beverage apparatus of FIG. 1, with a bottle cap of the beverage of FIG. 6 shown in the process of being removed.

Movement of the bottle 53 in a radially-inward and axially upward direction, relative to axis 40 and FIG. 10, as shown by arrow 100, causes lip 88 to exert an upward force, as shown by arrow 102, against the bottom 96 of the peripheral portion of the bottle cap. The beverage opener 72 thus enables the bottle cap 92 to be removed anywhere along the circumferential extent of the outer body.

Alternatively, to remove the bottle cap from the bottle 53, one can position the bottle cap within the beverage opener 72, keep the bottle relatively stationary and move the beverage holder 34 in a downward motion while inhibiting movement of the bottle. This is shown by the arrow of numeral 101 in FIG. 10.

Figure 6:
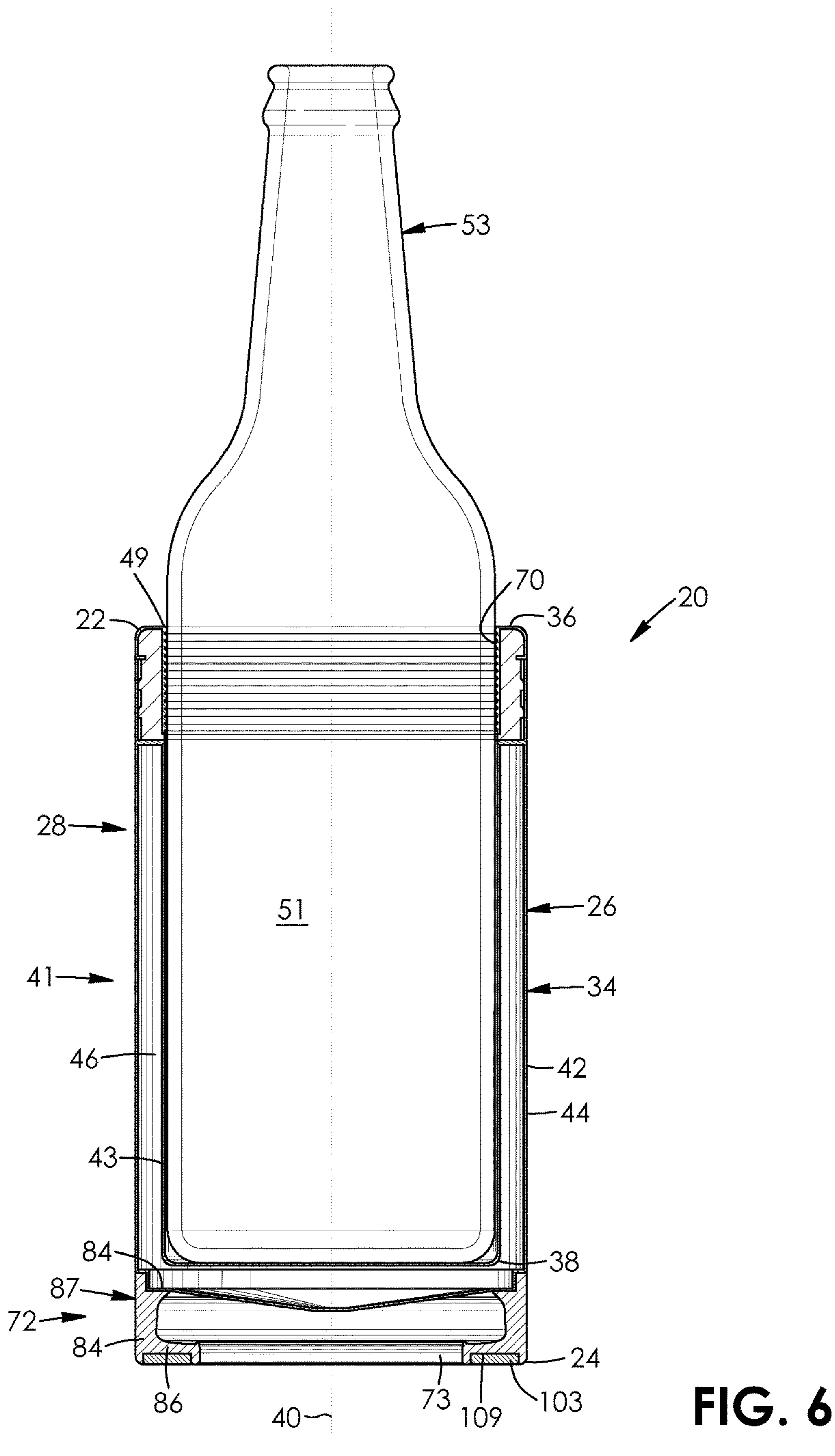
FIG. 6 is a sectional view similar to FIG. 5 of the beverage apparatus of FIG. 1 together with the beverage of FIG. 5 received within the beverage holder of the beverage apparatus.

As seen in FIG. 6, the bottle 53 with bottle cap removed is next inserted into the receptacle 49 via gripping portion 51 of the bottle. Lining 70 extends about and in this example sealably couples to the bottle so received within the beverage holder 34 via the gripping portion of the bottle in this example. The lining may be said to comprise at least one continuous, radially-inwardly extending seal shaped to sealably couple with the bottle 53 so received at least in part within the beverage holder. The beverage retaining assembly 50 is thus shaped to sealably couple with the bottle.

Figure 11:
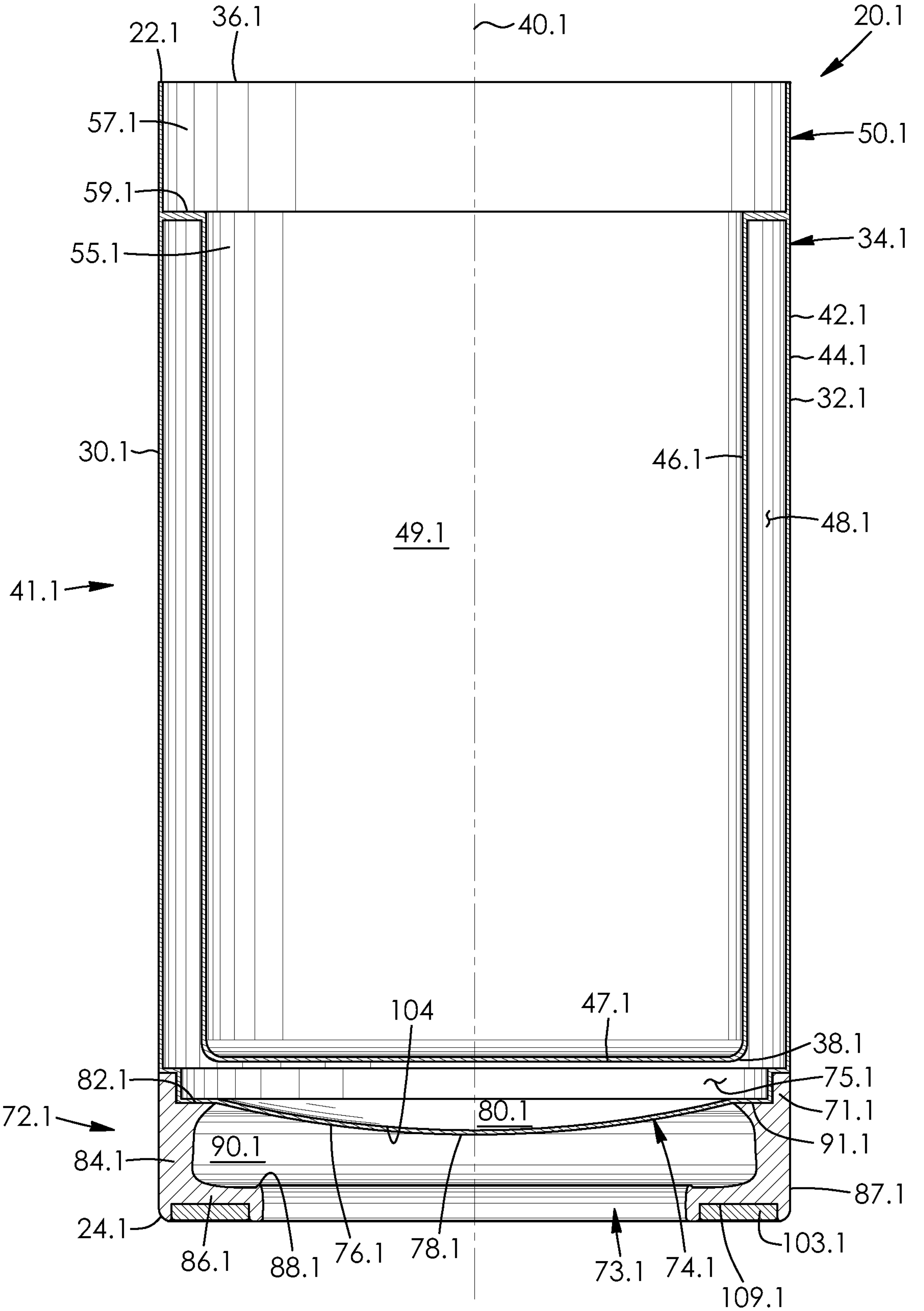
FIG. 11 is a sectional view similar to FIG. 5 of a beverage apparatus according to a second aspect.

FIG. 11 shows a beverage apparatus 20.1 according to a second embodiment. Like parts have like numbers and function as the embodiment shown in FIGS. 1 to 10 with the addition of "0.1". Beverage apparatus 20.1 is substantially the same as beverage apparatus 20 shown in FIGS. 1 to 10 with the exception that central portion 74.1 and outer wall 76.1 are spherical in this example and outwardly convex. Magnet 80.1 further includes an outwardly convex bottom surface 104 that is received by and abuts outer wall 76.1.

Figure 12:
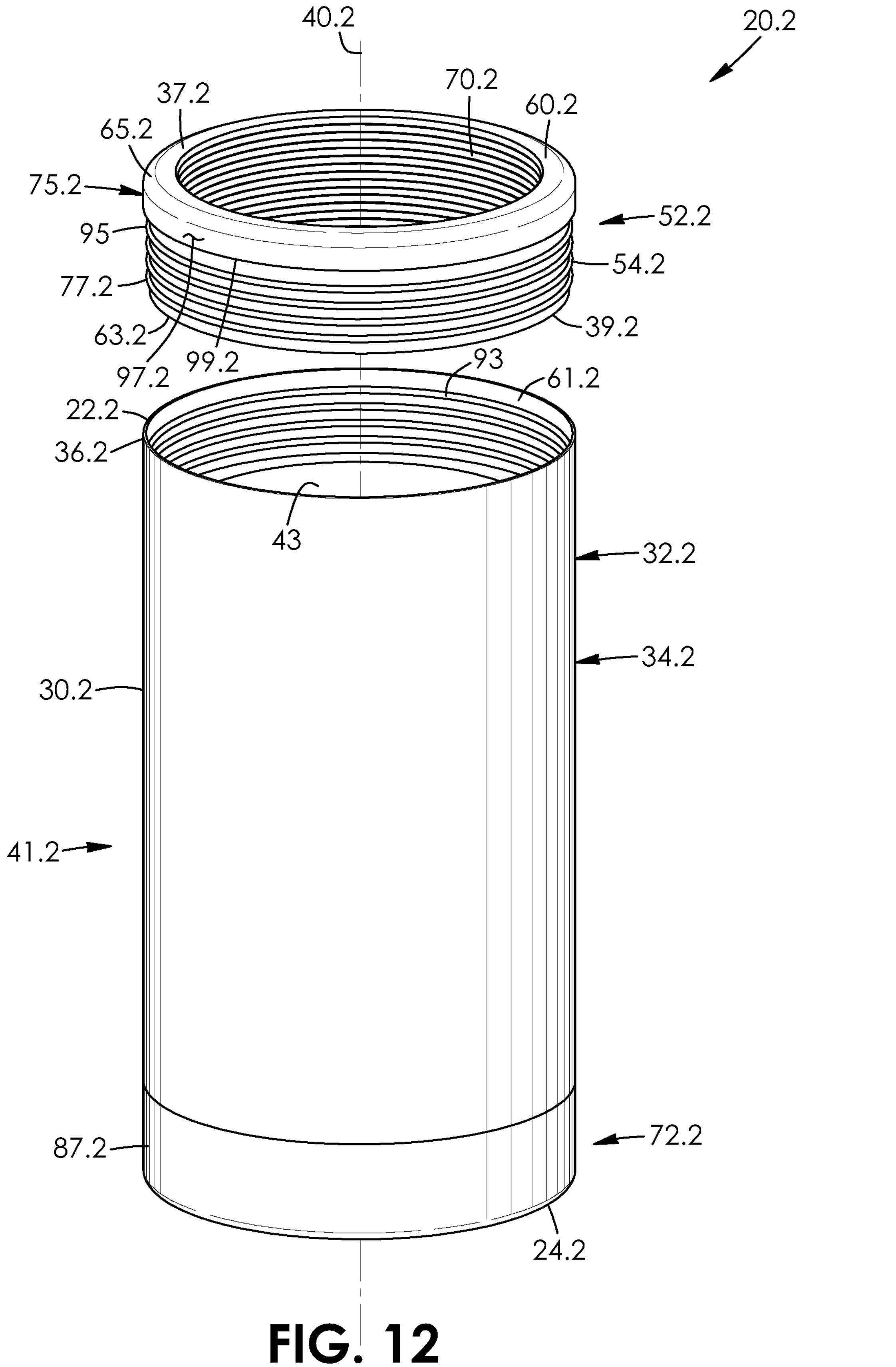
FIG. 12 is a top, front, exploded perspective view of a beverage apparatus according to a third aspect.
Figure 13:
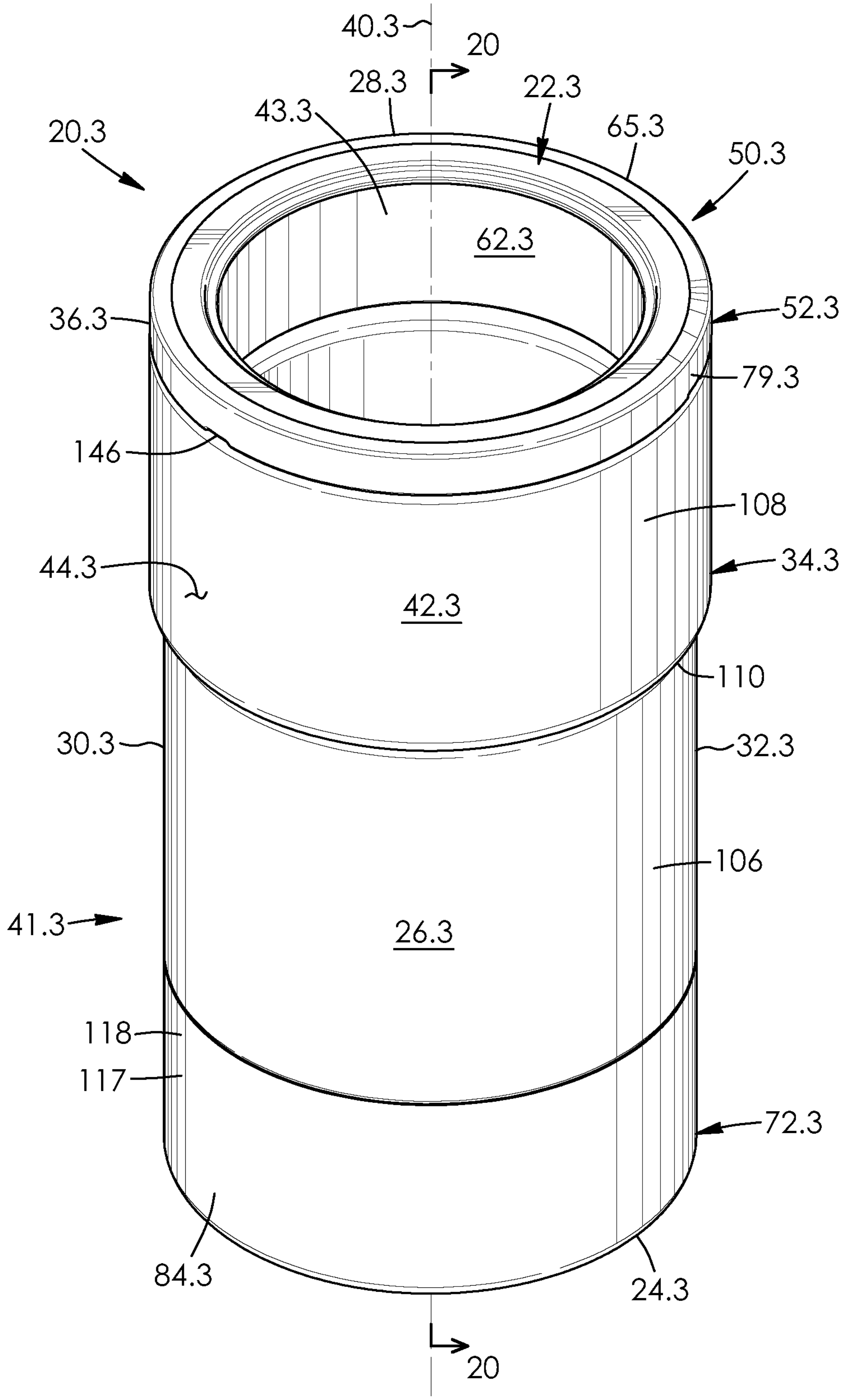
FIG. 13 is a top, front perspective view of the beverage apparatus according to a fourth aspect, the beverage apparatus including a beverage holder, a beverage opener and a beverage retaining assembly.
Figure 14:
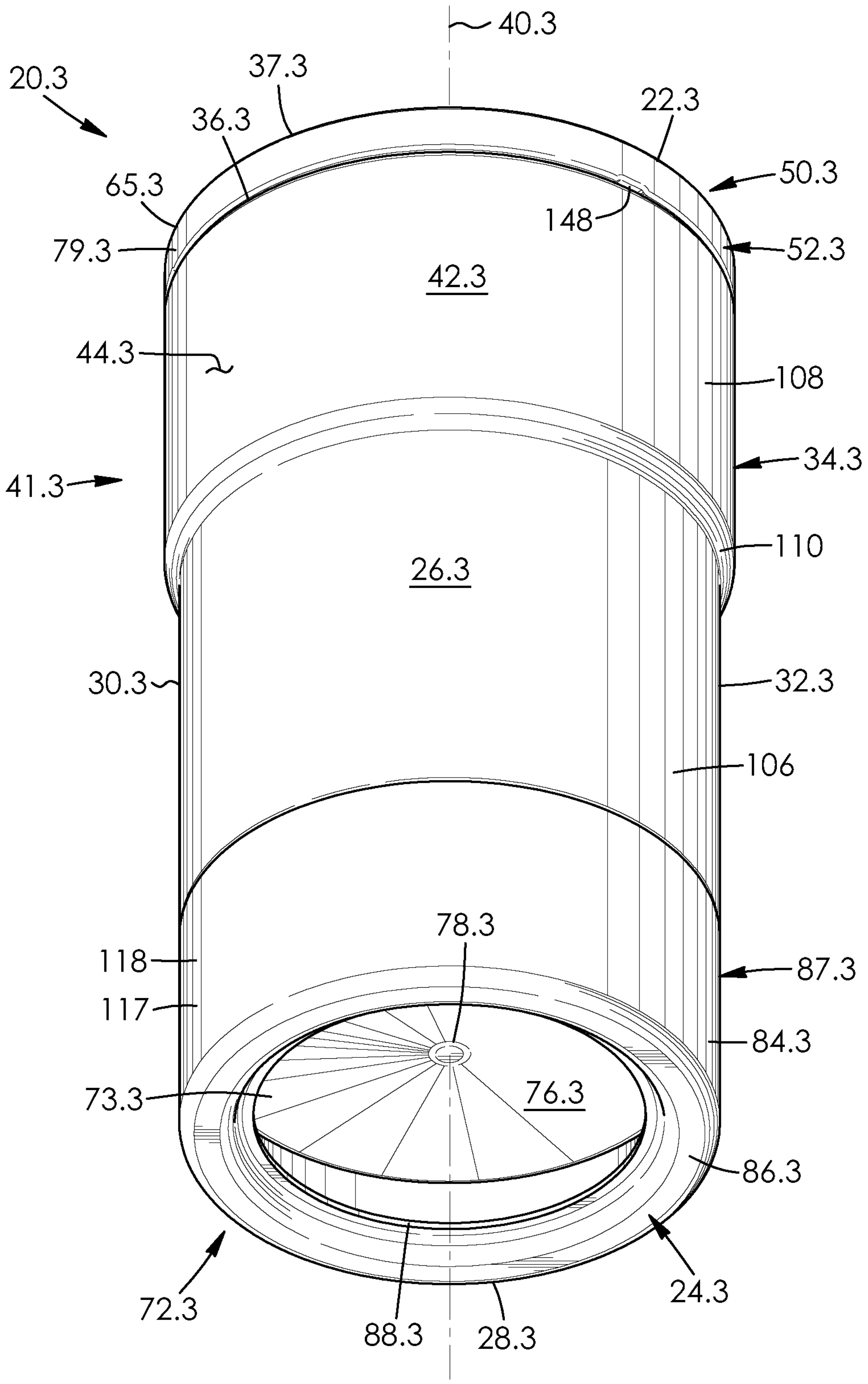
FIG. 14 is a bottom, rear perspective view thereof.

FIG. 12 shows a beverage apparatus 20.2 according to a third embodiment. Like parts have like numbers and function as the embodiment shown in FIGS. 1 to 10 with the addition of "0.2". Beverage apparatus 20.2 is substantially the same as beverage apparatus 20 shown in FIGS. 1 to 10 with the following exceptions.

Inner annular wall 61.2 of the beverage holder 32.2 includes inner female threading 93 thereon and extending radially inwards therefrom in this example. The outer annular surface 54.2 of outer body 52.2 of the beverage retaining assembly 50.2 has outer male threading 95 coupled thereto and extending radially outwards therefrom. The outer body of the beverage retaining assembly is shaped to threadably couple to the beverage holder 32.2 via said threading 93 and 95.

The beverage apparatuses as herein described provide many advantages, including comprising a 360° bottle opening system; a multi-layer thermal insulation system; and providing requisite structural strength to retain a beverage as a liquid. The beverage apparatus thus relates to a compact vacuum sealed beverage insulation and opening system for bottled beverages. It consists of a multi walled holder, 360° cylindrical bottle opening mechanism with a level base and an interchangeable seal for beverage insulation.

FIGS. 13 to 20 show a beverage apparatus 20.3 according to a fourth embodiment. Like parts have like numbers and function as the embodiment shown in FIG. 12 with decimal extension "0.3" replacing decimal extension "0.2" and being added for corresponding parts not previously having a decimal extension. Beverage apparatus 20.3 is substantially the same as beverage apparatus 20.2 shown in FIG. 12 with the following exceptions.

Figure 15:
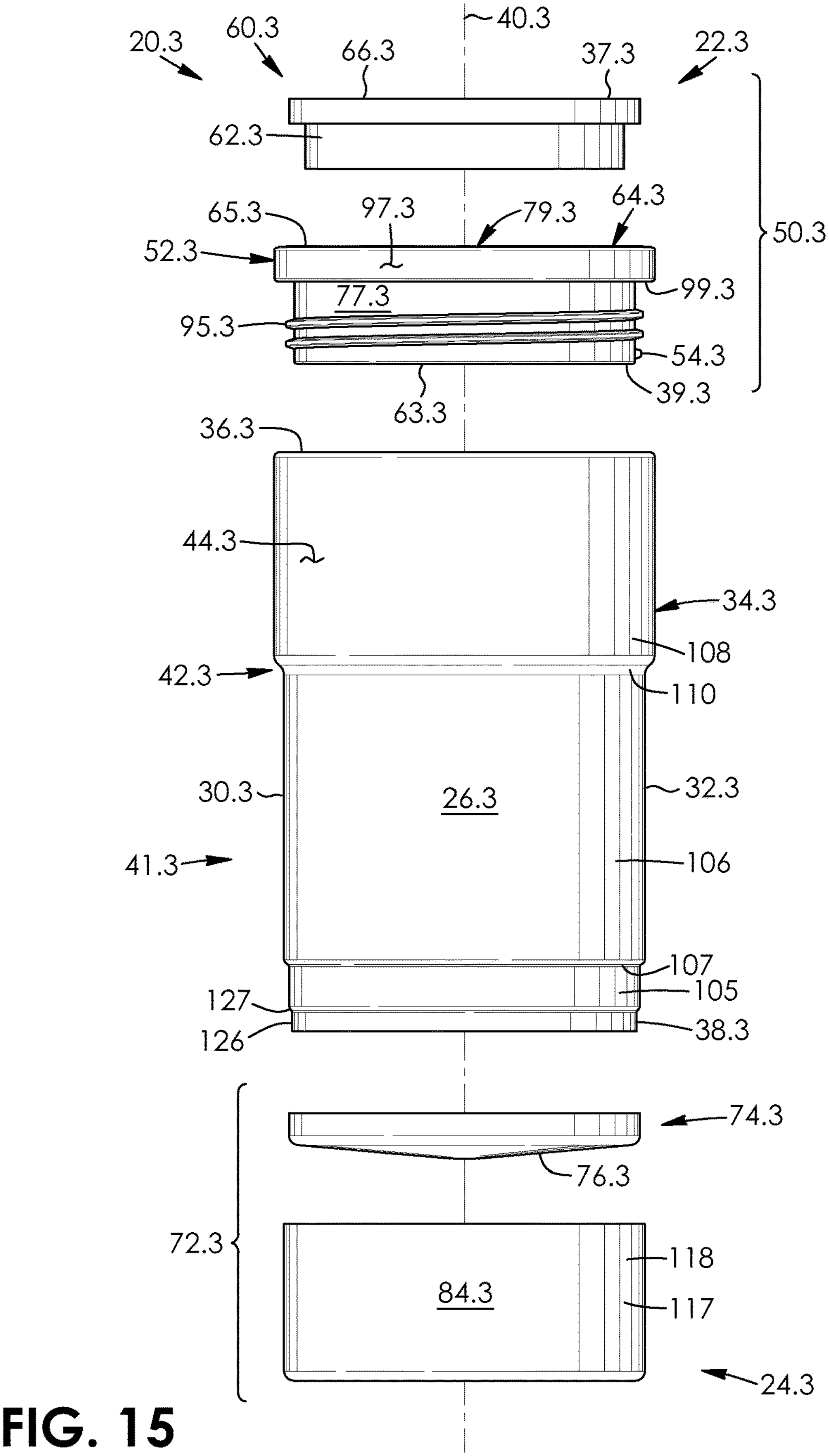
FIG. 15 is an exploded front elevation view thereof.

As seen in FIG. 15, the annular outer wall 42.3 of beverage holder 34.3 comprises a first or lower portion 105 and a second or intermediate portion 106 coupled to, integrally formed with and extending radially outwards from the lower portion thereof via shoulder 107. The annular outer wall of the beverage holder further includes in this example a third or upper portion 108 coupled to, integrally formed with and extending radially outwards from the central portion thereof via annular shoulder 110. The upper portion extends from the top 36.3 thereof towards the bottom 24.3 of the beverage apparatus 20.3. The intermediate portion 106 couples to and extends downwards from the upper portion 108 relative to FIG. 15. The lower portion 105 couples to and extends downwards from the intermediate portion 106 relative to FIG. 15.

Figure 16:
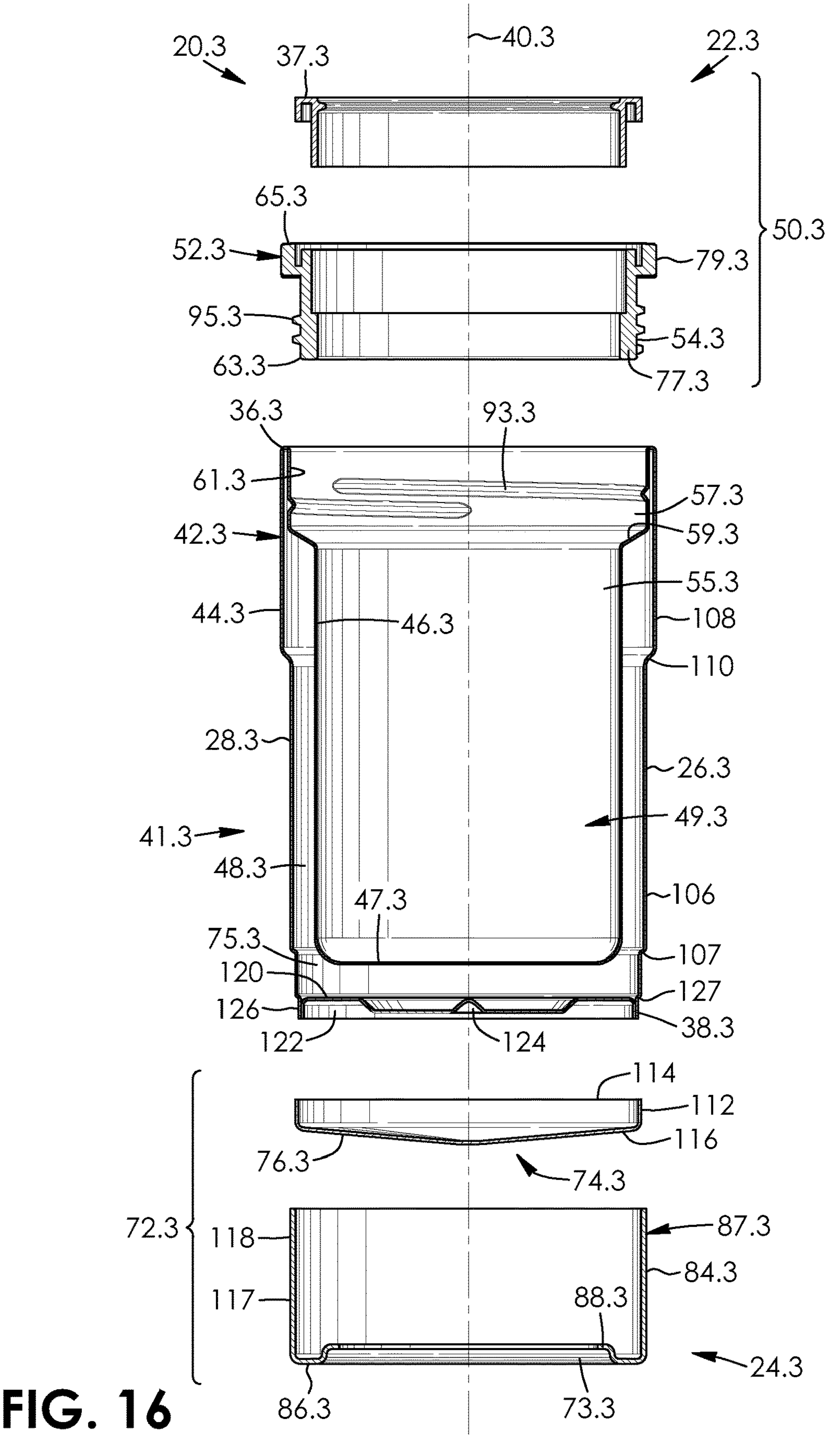
FIG. 16 is an exploded front longitudinal section view thereof.

Referring to FIG. 16, the central portion 76.3 of the beverage opener 72.3 includes an annular member 112 with a first or upper open end 114 and a second or closed end 116. Outer wall 76.3 of the central portion of the beverage opener couples to, is integrally formed with, and extends downwards and radially inwards from the annular member 112 of the central portion of the beverage opener in this example.

Figure 20:
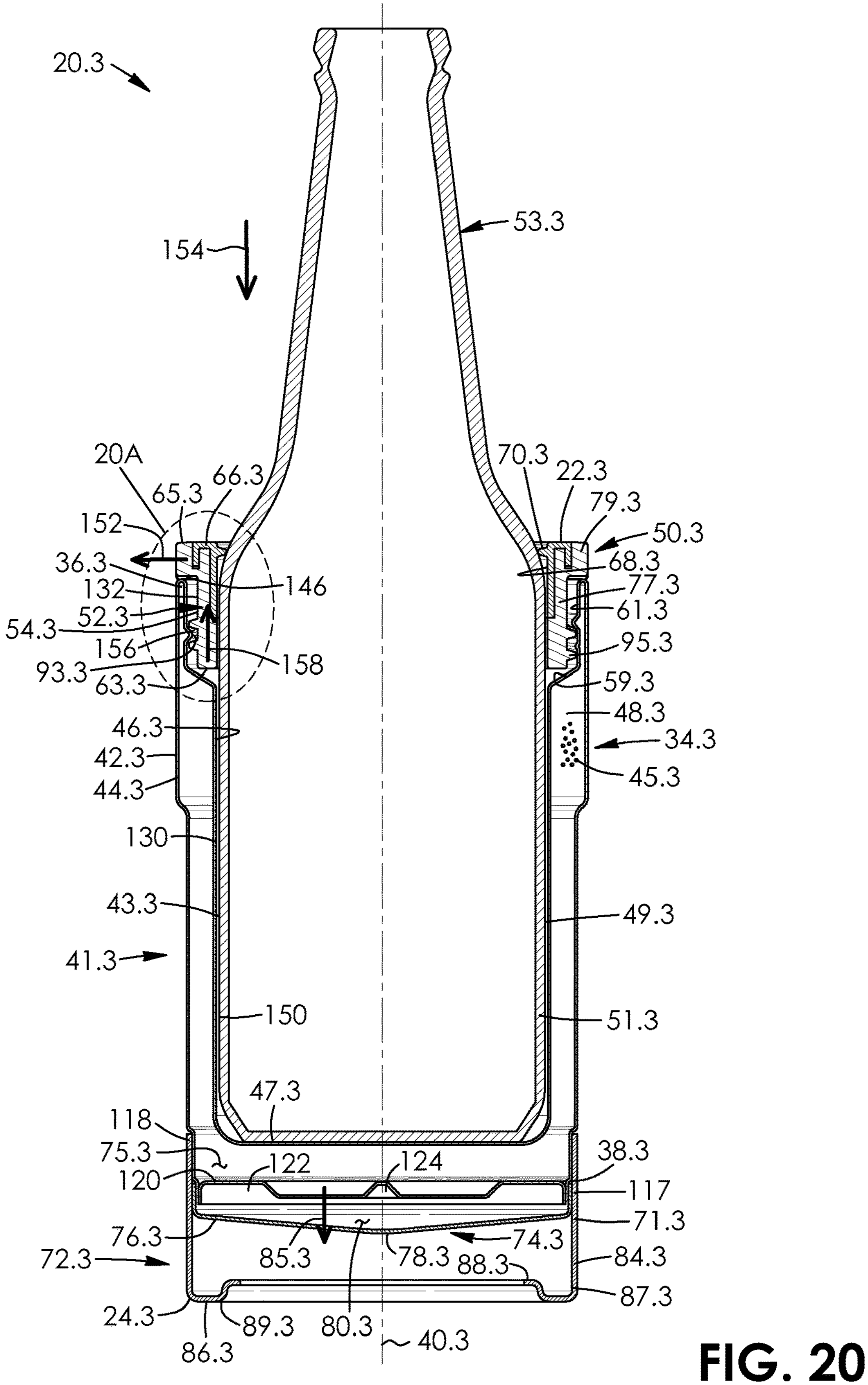
FIG. 20 is an assembled sectional view taken along lines 20-20 of the beverage apparatus of FIG. 13, with a beverage shown received therein and sealably coupled thereto.
Figure 20A:
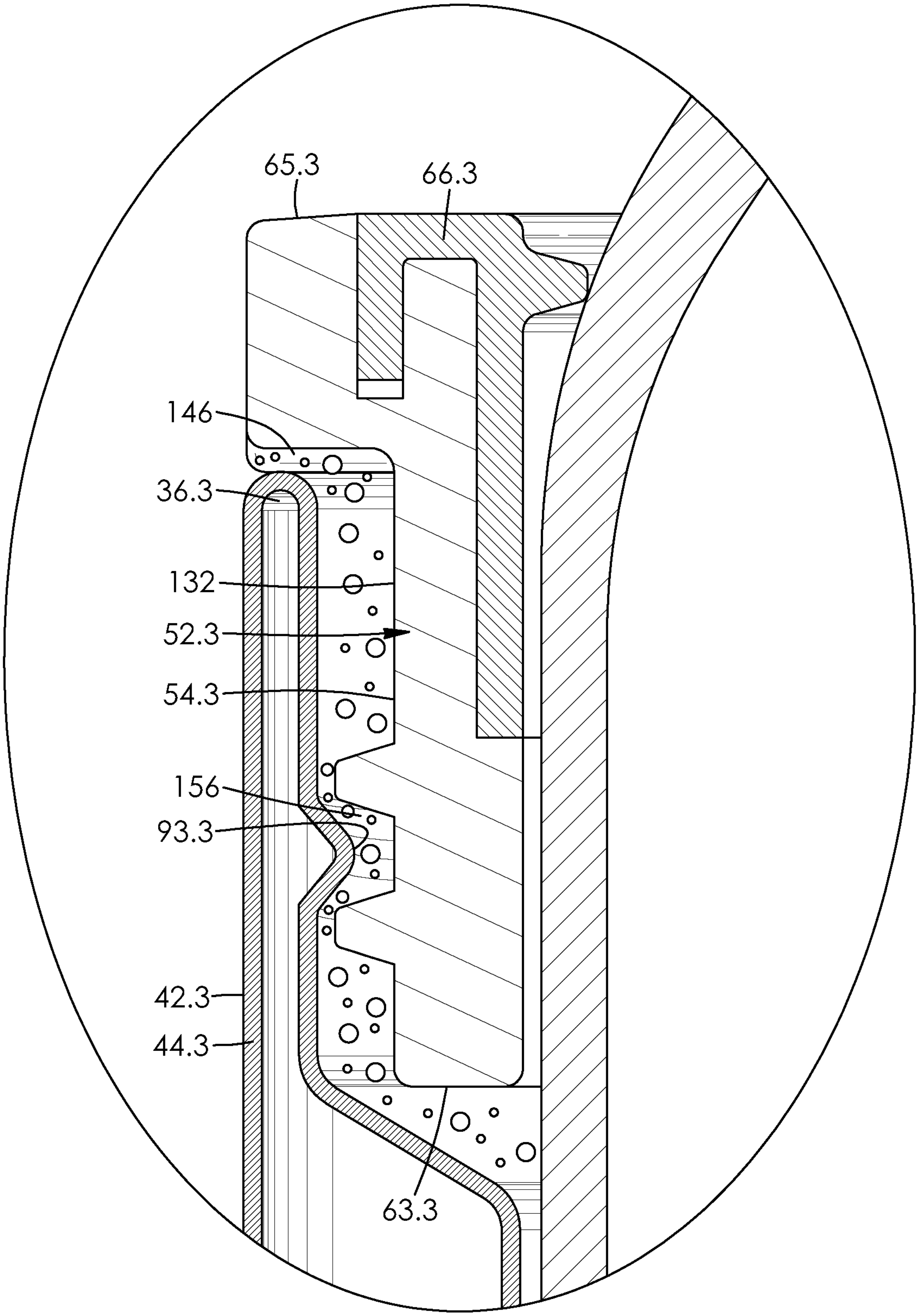
FIG. 20A is an enlarged sectional view of part of the beverage holder thereof and beverage retaining assembly thereof, with the beverage apparatus of FIG. 20 being shown in fragment.
Figure 21:
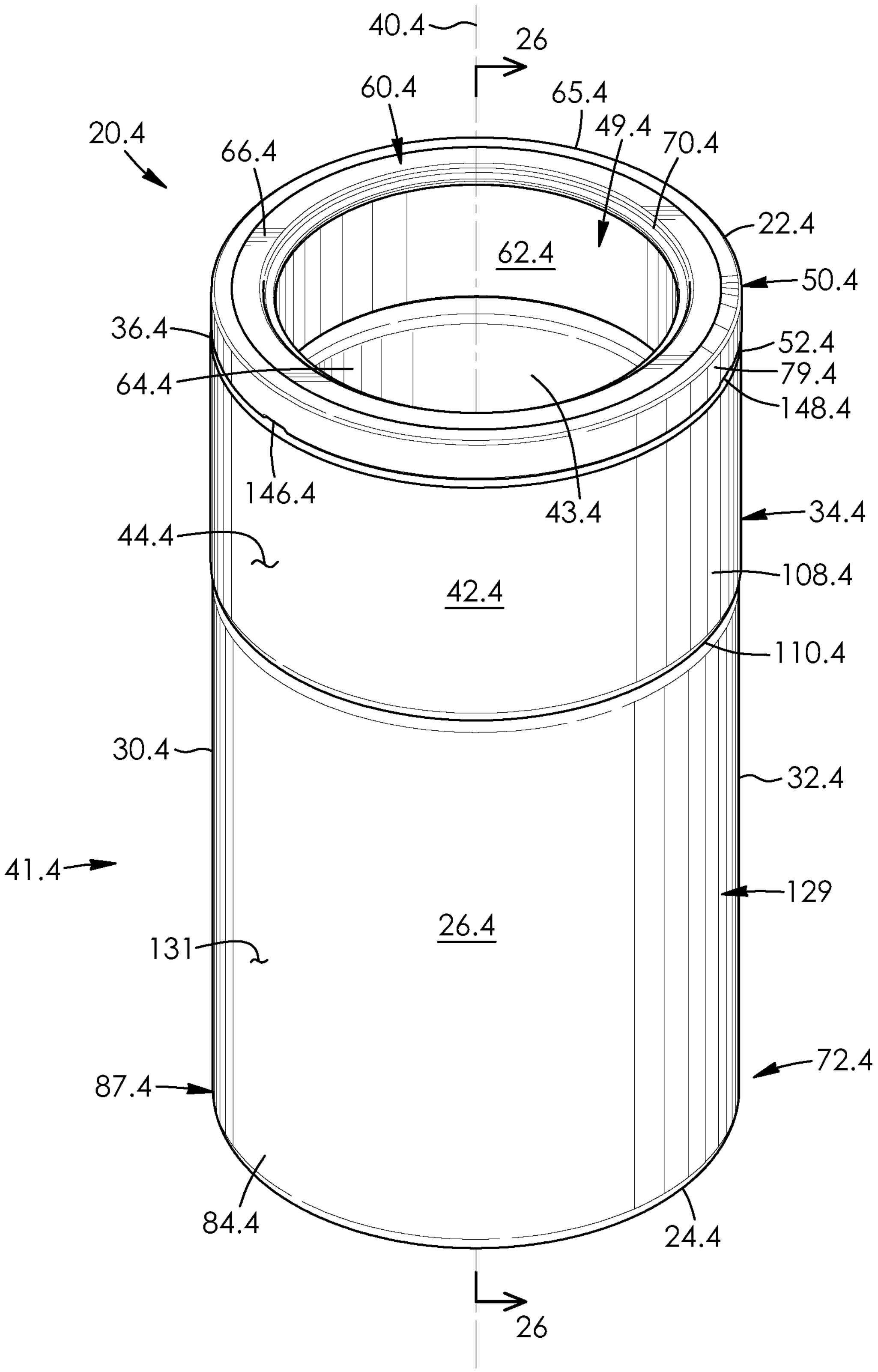
FIG. 21 is a top, front perspective view of the beverage apparatus according to a fifth aspect, the beverage apparatus including a beverage holder, a beverage opener and a beverage retaining assembly.
Figure 22:
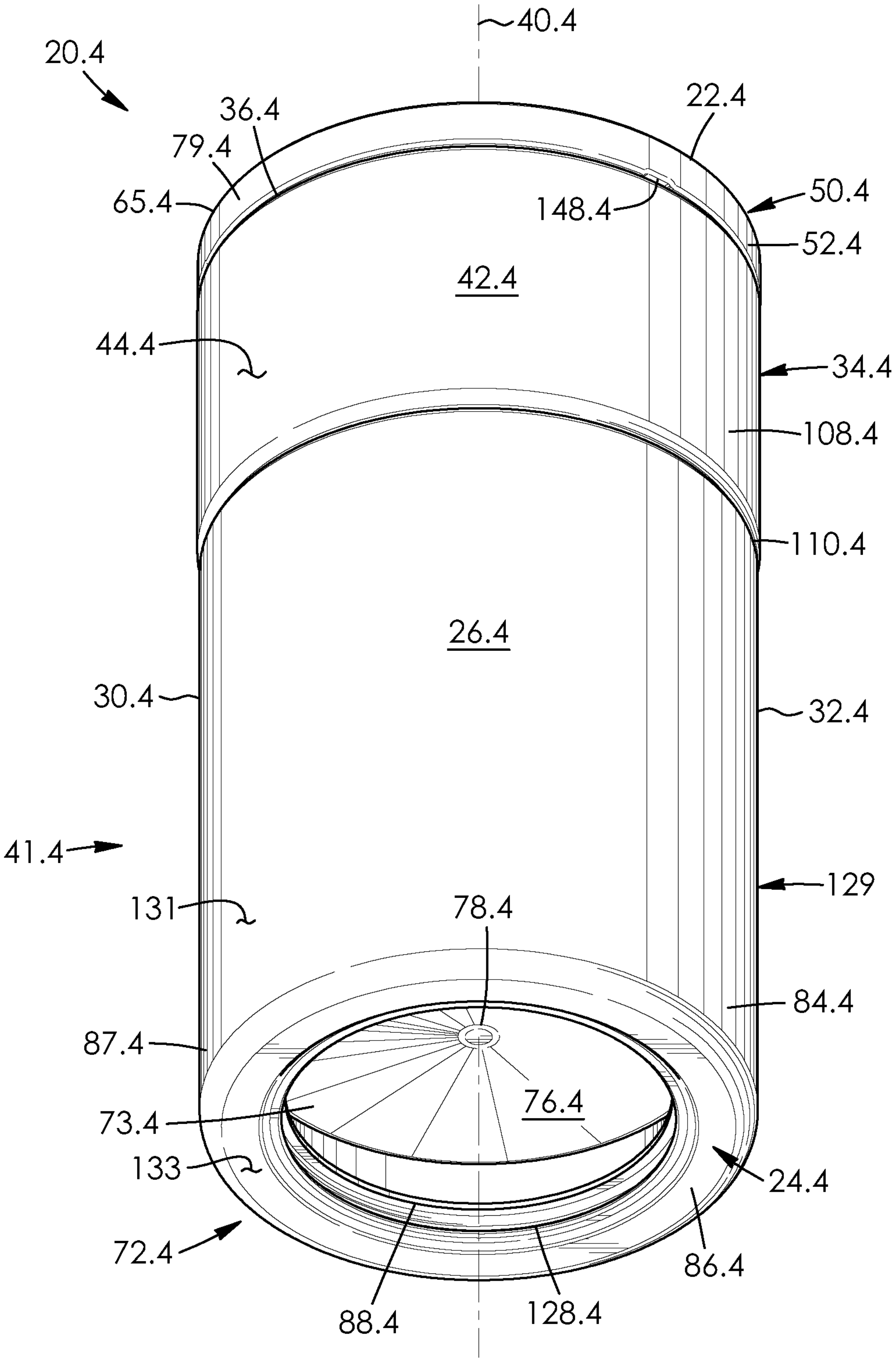
FIG. 22 is a bottom, rear perspective view thereof.
Figure 23:
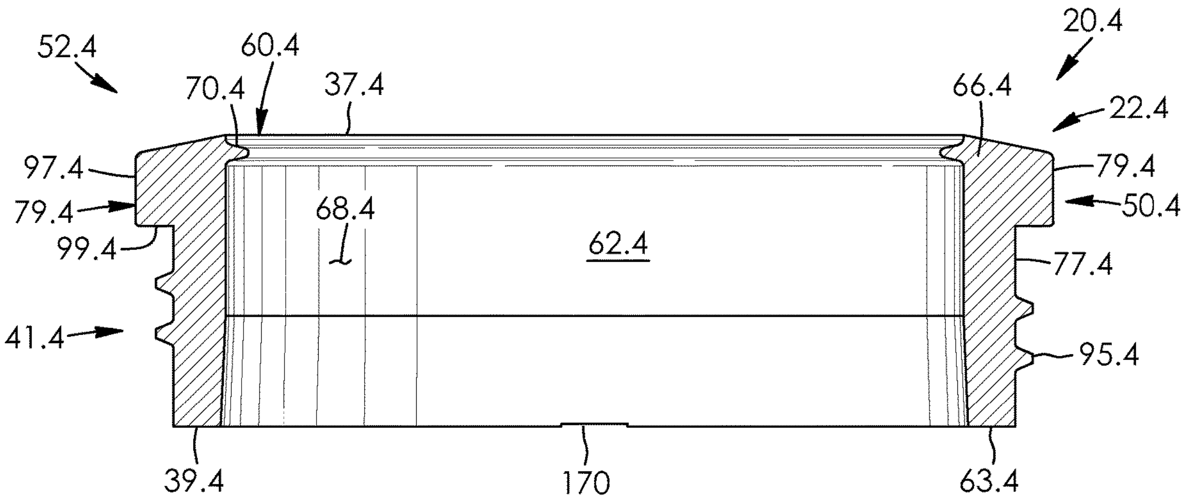
FIG. 23 is a longitudinal sectional view of the beverage retaining assembly of the beverage apparatus FIG. 21.

Referring to FIGS. 16 and 20, the annular member 112 and outer wall 76.3 of the central portion 76.3 of the beverage opener 72.3 are shaped to couple with and in this example snugly fit within an intermediate portion 117 of sleeve 84.3 of outer body 87.3 of the beverage opener.

As seen in FIG. 16, the beverage holder 34.3 includes a bottom outer wall 120 extending along the bottom 38.3 thereof. The bottom outer wall is corrugated in part in this example so as to strengthen the same, forming an outer annular channel 122 and a a central cone shaped indent 124. The bottom outer wall 120 is for the vacuum insulation process. The cone shaped indent has an aperture (not shown) in the center thereof that during the manufacturing process is used to evacuate air and gases from chambers 48.3 and 75.3. The aperture is then sealed to inhibit outside gases from entering within the chambers.

As seen in FIG. 15, the beverage holder 34.3 includes in this example a distal end portion 126 extending from the bottom 38.3 thereof towards the top 36.3 thereof and of which bottom outer wall 120 is a part thereof. The distal end portion of the beverage holder couples to, is integrally formed with, and extends radially inwards from the lower portion 105 of the outer wall 42.3 of the beverage holder 34.3 via shoulder 127. The distal end portion 126 of the beverage holder 34.3 is shaped to couple with and extend within annular member 112 of the central portion 76.3 of the beverage opener 72.3. The central portion of the beverage opener couples to the beverage holder thereby in this example as seen in FIG. 20.

Referring to FIGS. 16 and 20, the distal end portion 126 of the beverage holder 34.3 and the lower portion 105 of outer wall 42.3 of the beverage holder are shaped to couple with and in this example snugly fit within the intermediate portion 117 and an upper portion 118 of sleeve 84.3 of outer body 87.3 of the beverage opener, respectively. The beverage opener 72.3 couples to the beverage holder 34.3 thereby in this example as seen in FIG. 20.

As seen in FIG. 20, beverage opener 72.3 includes a protruding member, in this example lower annular inner peripheral portion, in this case lip 88.3 coupled to and extending radially inwards from flange 86.3 thereof. The lip extends perpendicular to axis 40.3 and is spaced-apart upwards from bottom 24.3 of the beverage apparatus 20.3 in this example. Lip 88.3 is S-shaped in longitudinal cross-section in this example.

As seen in FIG. 20, annular inner wall 46.3 of the beverage holder 34.3 includes a first or upper portion 130 and a second or lower portion 132 coupled to, integrally formed with and extending radially inwards relative to the upper portion via shoulder or ledge 59.3. The ledge extends axially downwards and radially inwards in this example from the upper portion of the annular inner wall to the lower portion of the annular inner wall.

The upper portion 130 of the annular inner wall 46.3 of the beverage holder 34.3 extends from the top 36.3 of the beverage holder towards the bottom 24.3 of the beverage apparatus 20.3. The upper portion of the annular inner wall of the beverage holder extends about and defines outer bore 57.3 seen in FIG. 16 in this example. As seen in FIG. 16, inner female threading 93.3 is in this example integrally formed with and extends radially inwards from the upper portion 130 of the annular inner wall 46.3 of the beverage holder 34.3. Still referring to FIG. 16, the upper portion of the annular inner wall of the beverage holder couples to and is integrally formed with the upper portion 108 of the annular outer wall 42.2 of the beverage holder via top 36.3 of the beverage holder in this example. However this is not strictly required.

Figure 19:
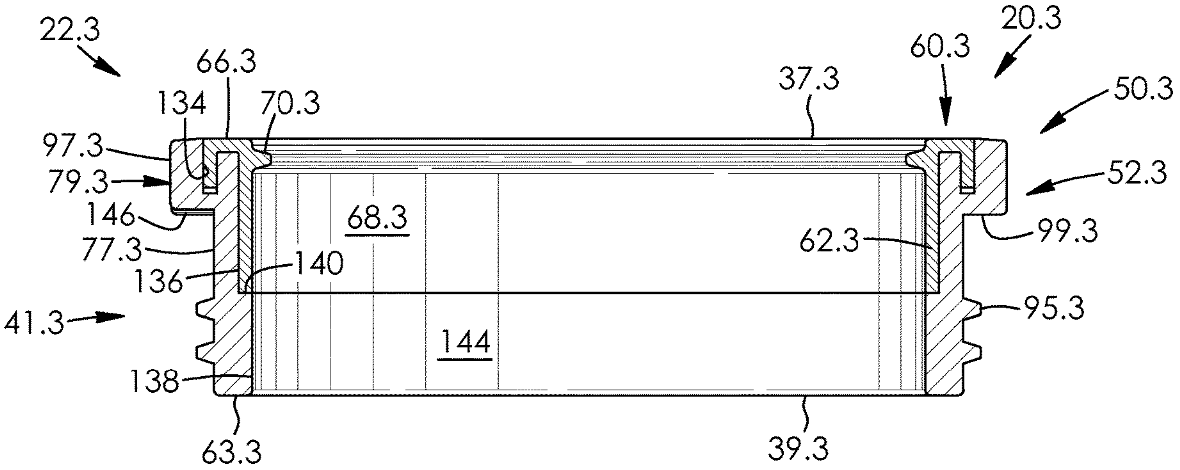
FIG. 19 is a longitudinal sectional view taken along lines 19-19 of the beverage retaining assembly of FIG. 18.

Referring to FIG. 19, flange 66.3 of the inner annular member 60.3 of the beverage retaining assembly 50.3 is an inverse U-shaped in longitudinal cross-section in this example. The inner annular member of the beverage retaining assembly 50.3 has a continuous inner peripheral surface 68.3 in this example. Continuous seal 70.3 couples to and extends radially inwardly from the flange 66.3 of the inner annular member 60.3 of the beverage retaining assembly 50.3. The seal is trapezoidal in shape in longitudinal section in this example.

Still referring to FIG. 19, the beverage retaining assembly 50.3 has an annular groove 134 that extends axially into outer flange 79.3 of the outer annular member 52.3 of the beverage retaining assembly from the top 37.3 thereof towards the bottom 39.3 thereof. Flange 66.3 of inner annular member 60.3 is L-shaped in lateral section in this example and shaped to be received within groove 134 such that the top 37.3 of the beverage retaining assembly 50.3 may be relatively flush. Seal 70.3 thus also couples to and radially inwardly extends from the outer flange 79.3 of the outer annular member 52.3 of the beverage retaining assembly. The outer annular member has in this example an outer bore 136 and an inner bore 138 which is radially-inwardly extending relative to the outer bore and which is linked via annular shoulder 140 extend therebetween. Sleeve 62.3 of inner annular member 62.3 is shaped to be received within outer bore 136 and abut shoulder 140 such that inner annular surface 68.3 of the inner annular member is flush with lower inner annular surface 144 of the outer annular member 52.3 in this example.

Figure 17:
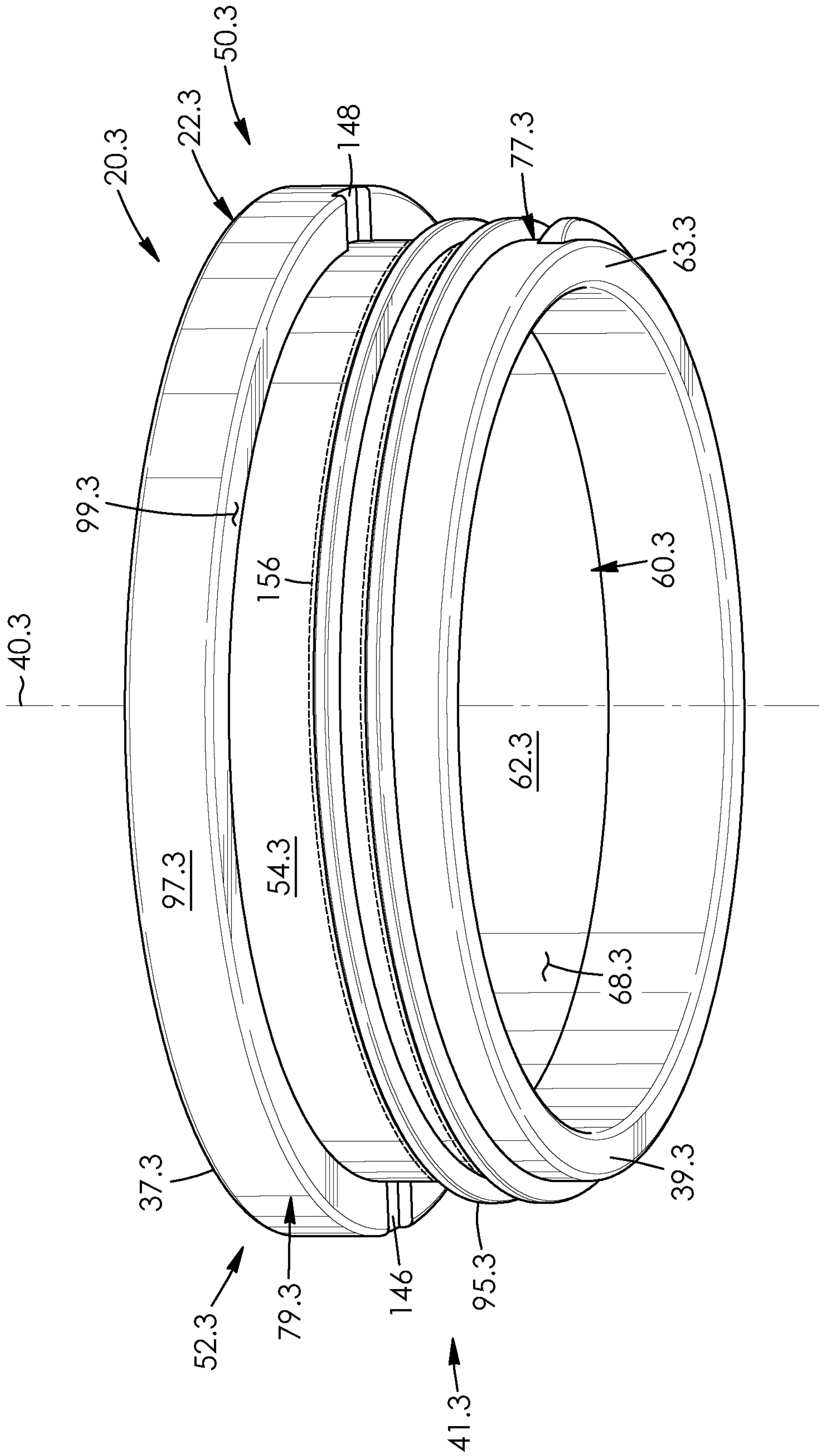
FIG. 17 is a front, right side, bottom perspective view of the beverage retaining assembly of the beverage apparatus of FIG. 13.
Figure 18:
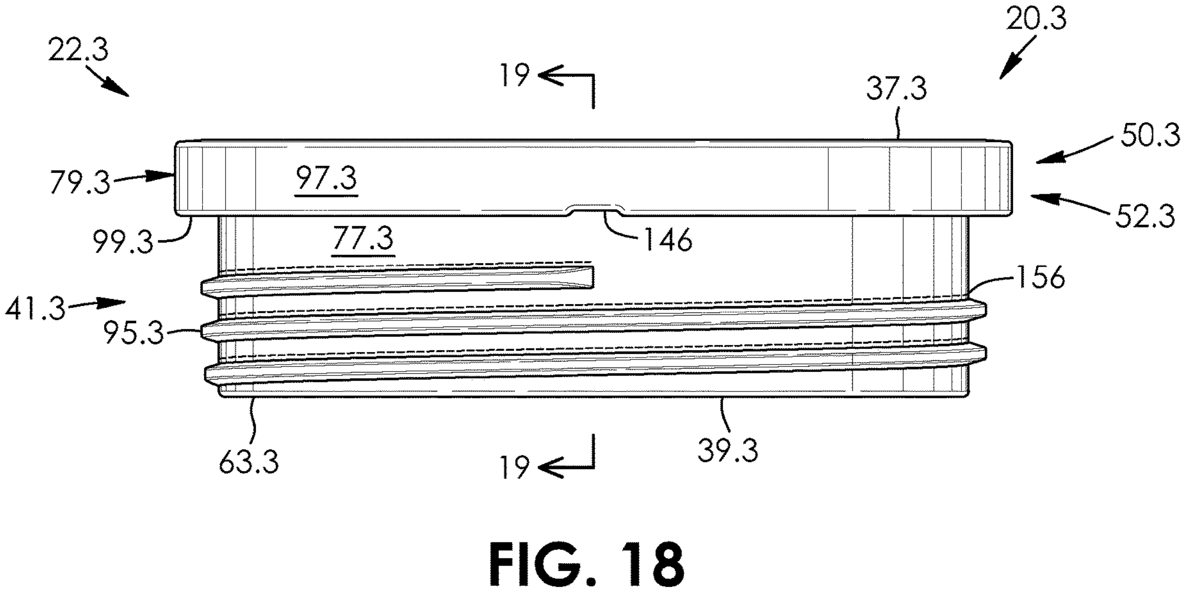
FIG. 18 is a left side elevation view of the beverage retaining assembly of FIG. 17.

Referring to FIG. 17, flange 79.3 of the outer annular member 52.3 of the beverage retaining assembly 50.3 has at least one, and this example a plurality of flange passageways, in this case flange passageways 146 and 148. Each flange passageway comprises a recess or groove in this example and is square shaped in lateral cross-section in this example; however, this is not strictly required and the flange passageways may comprise other shapes in other embodiments.

The flange passageways 146 and 148 are circumferentially spaced-apart in this example. The flange passageways of flange 79.3 extend axially and radially inwards relative to the longitudinal axis 40.3 in this example. The flange passageways are spaced outwards from the continuous inner peripheral surface 68.3 of the inner annular member 60.3 of the beverage retaining assembly 50.3. The flange passageways 146 and 148 extend from the outer peripheral surface, in this example outer annular surface 97.3 of the flange inwards towards the continuous inner peripheral surface of the inner annular member of the beverage retaining assembly. The flange passageways may thus be said to extend from the outer peripheral surface of the beverage retaining assembly 50.3 towards the inner peripheral surface of the beverage retaining assembly. The flange passageways 146 and 148 extend from the shoulder 99.3 of flange 79.3 towards the top 37.3 of the beverage retaining assembly 50.3

Referring to FIG. 20, the flange passageways are shaped to enable air 150 from the interior 43.3 of the beverage holder 34.3 to exit therefrom. In this example, the flange passageways are shaped to enable air 150 from the interior 43.3 of the beverage holder 34.3 to pass therethrough, as shown by arrow 152, as the beverage, in this example beer bottle 53.3 is inserted into the beverage holder 34.3, as shown by arrow 154.

Still referring to FIG. 20, the outer male threading 95.3 of the outer body 52.3 of the beverage retaining assembly 50.3 and inner female threading 93.3 of the beverage holder 34.3 are spaced to form an annular passageway 156 therebetween. The annular passageway is in fluid communication with the interior 43.3 of the beverage holder 34.3. The flange passageways 146 and 148 seen in 17 are in fluid communication with the annular passageway 156. Referring to FIG. 20, the outer male threading 95.3 of the outer body 52.3 of the beverage retaining assembly 50.3 and the inner female threading 93.3 of the beverage holder 32.3 are thus spaced relative to each other to enable at least some of air 150 from the interior 43.3 of the beverage holder 34.3 to pass therethrough, as shown by arrow 158 when the bottle 53.3 is inserted into the beverage holder as shown by arrow 154.

The beverage apparatus 20.3, with its seal and passageways as herein described, may promote enhanced temperature retention and insulation within the interior 43.3 of the beverage holder 34.3. The beverage retaining assembly 50.3 as herein described may thus function to remove and vacate warm air from the beverage holder 34.4 upon insertion of the bottle 53.3 therewithin while functioning to promote retention of the temperature of the beverage by inhibiting new warm air flow.

FIGS. 21 to 27 show a beverage apparatus 20.4 according to a fifth embodiment. Like parts have like numbers and function as the embodiment shown in FIGS. 13 to 20 with decimal extension "0.4" replacing decimal extension "0.3" being added for parts not previously having a decimal extension. Beverage apparatus 20.4 is substantially the same as beverage apparatus 20.3 shown in FIGS. 13 to 20 with the following exceptions.

Figure 26:
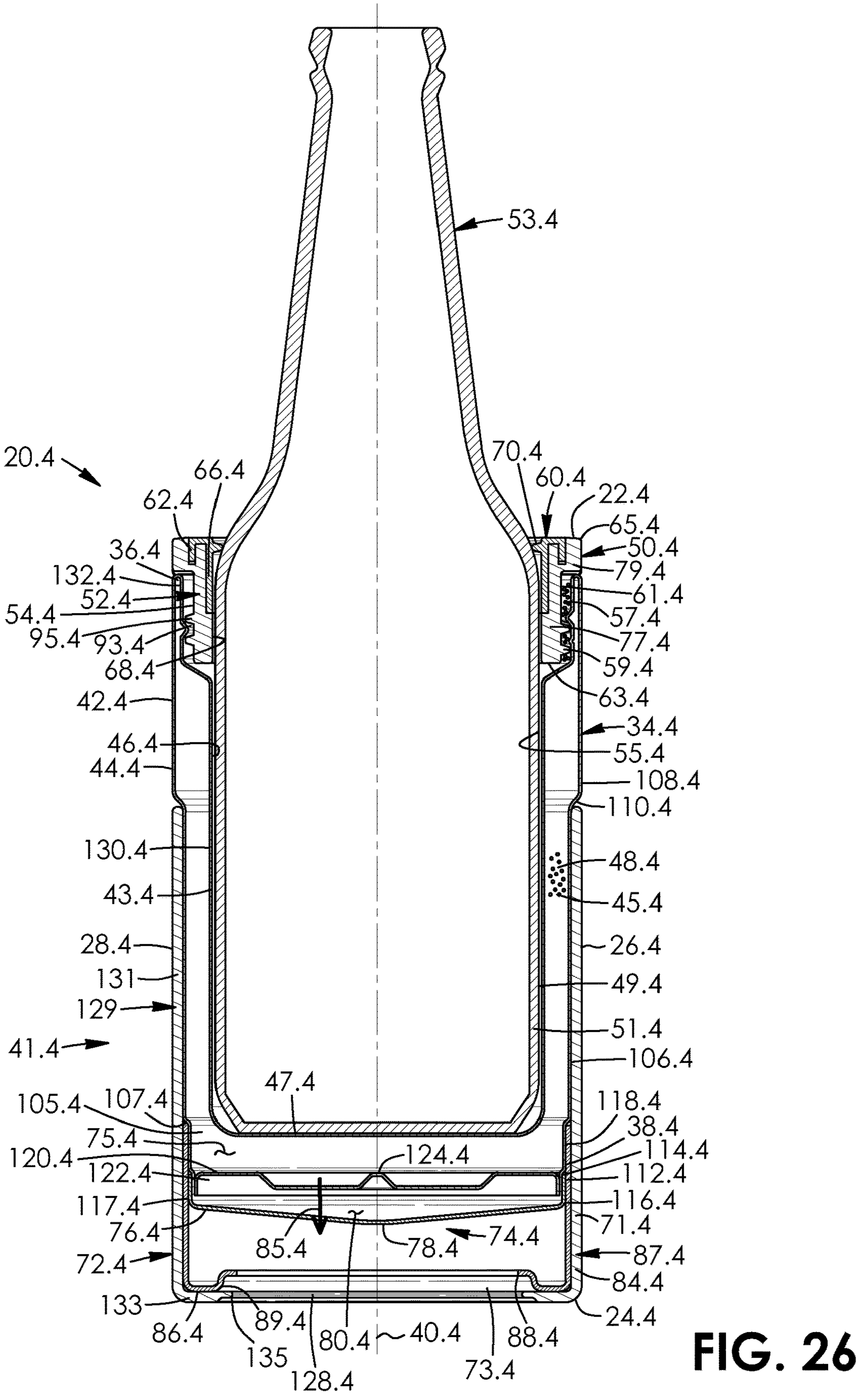
FIG. 26 is an assembled sectional view taken along lines 26-26 of the beverage apparatus of FIG. 21, with a beverage shown received therein and sealably coupled thereto.

As seen in FIG. 26, beverage apparatus 20.4 includes an outer and removable beverage holder shell 129 made of an insulating material, in this example foam. The shell includes an outer sleeve 131 that extends about intermediate portion 106.4 of the beverage holder 32.4 and outer body 87.3 of the beverage opener 72.4 in this example. The sleeve 131 extends from annular shoulder 110.4 to bottom 24.4 of the beverage apparatus 20.4. The shell 129 includes a flange 133 coupled to and radially inwardly extending from sleeve 131 adjacent the bottom of the beverage apparatus. The flange includes a tapered end 135 spaced axially upwards from the bottom 24.4 of the beverage apparatus 20.4 in this example. The tapered end may be said to comprise part of a second or upper protruding member, in this example upper annular inner peripheral portion, in this case second lip 128 spaced axially from and below lip 88.4 in this case.

Figure 25:
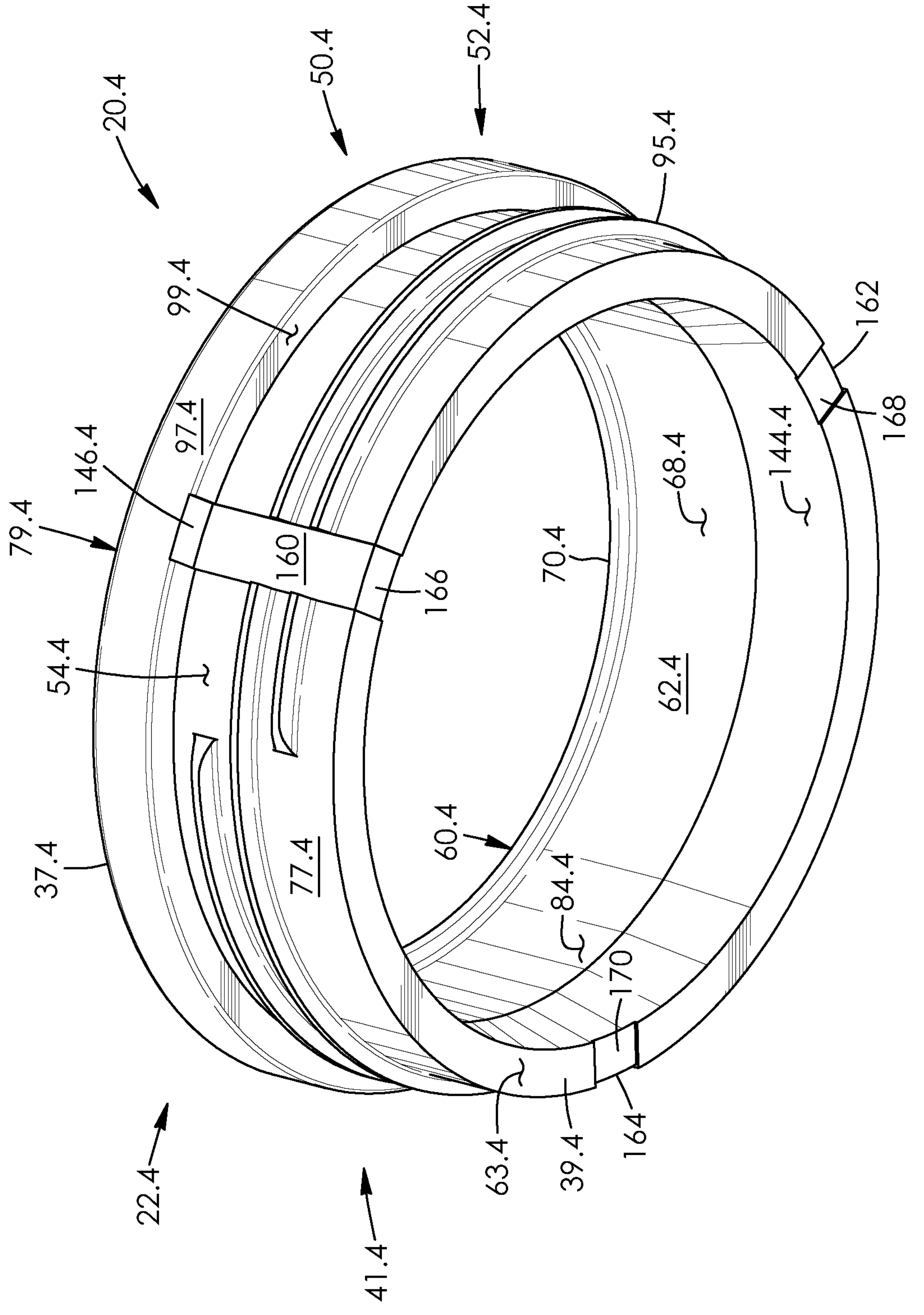
FIG. 25 is a bottom, right side perspective view of the beverage retaining assembly of the beverage apparatus FIG. 23.

Beverage retaining assembly 50.4 includes three flange passageways in this example, as shown by flange passageway 146.6 in FIG. 25.

Still referring to FIG. 25, sleeve 77.4 of outer annular member 52.4 of the beverage retaining assembly includes at least one and in this example, a plurality of sleeve passageways, in this case sleeve passageways 160, 162 and 164. The sleeve passageways are circumferentially spaced-apart in this example. The sleeve passageways align with and are in fluid communication with respective flange passageways, as shown in FIG. 25 by sleeve passageway 160 aligned with and in fluid communication with outer annular member 146.4. Each sleeve passageway 160, 162 and 164 comprises a recess or groove in this example; however, this is not strictly required and the sleeve passageways may comprise other shapes in other embodiments.

Figure 24:
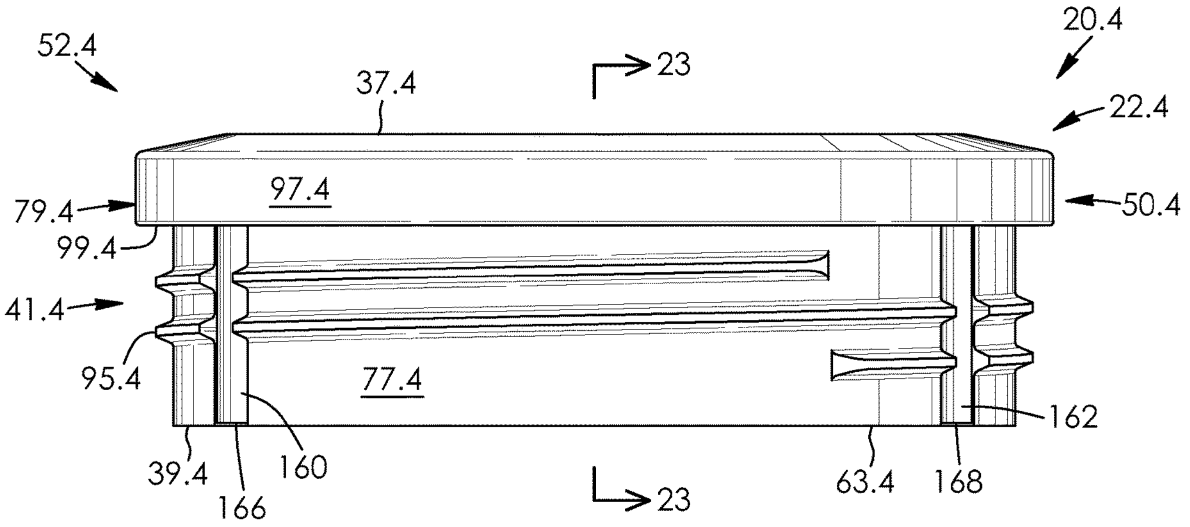
FIG. 24 is a front elevation view of the beverage retaining assembly of the beverage apparatus FIG. 23.

Referring to FIG. 24, the flange passageways extend from the bottom 39.4 of the beverage retaining assembly 50.4 towards the top 37.4 of the beverage retaining assembly. As seen in FIG. 25, the sleeve passageways 160, 162 and 164 extend from the outer peripheral surface, in this example outer annular surface 54.4 of the outer body 52.4 of the beverage retaining assembly 50.4 towards inner peripheral surfaces, in this example inner annular surfaces 68.4 and 144.4 of the inner annular member 60.4 and outer annular member of the beverage retaining assembly. The sleeve passageways may thus be said to extend from the outer peripheral surface towards the inner peripheral surface of the beverage retaining assembly 50.4. The sleeve passageways 160, 162 and 164 are outwardly spaced-apart from the inner annular surfaces 68.4 and 144.4 of the inner annular member 60.4 and outer annular member of the beverage retaining assembly. The sleeve passageways may thus be said to be spaced-apart from the inner peripheral surface of the beverage retaining assembly 50.4.

Figure 27:
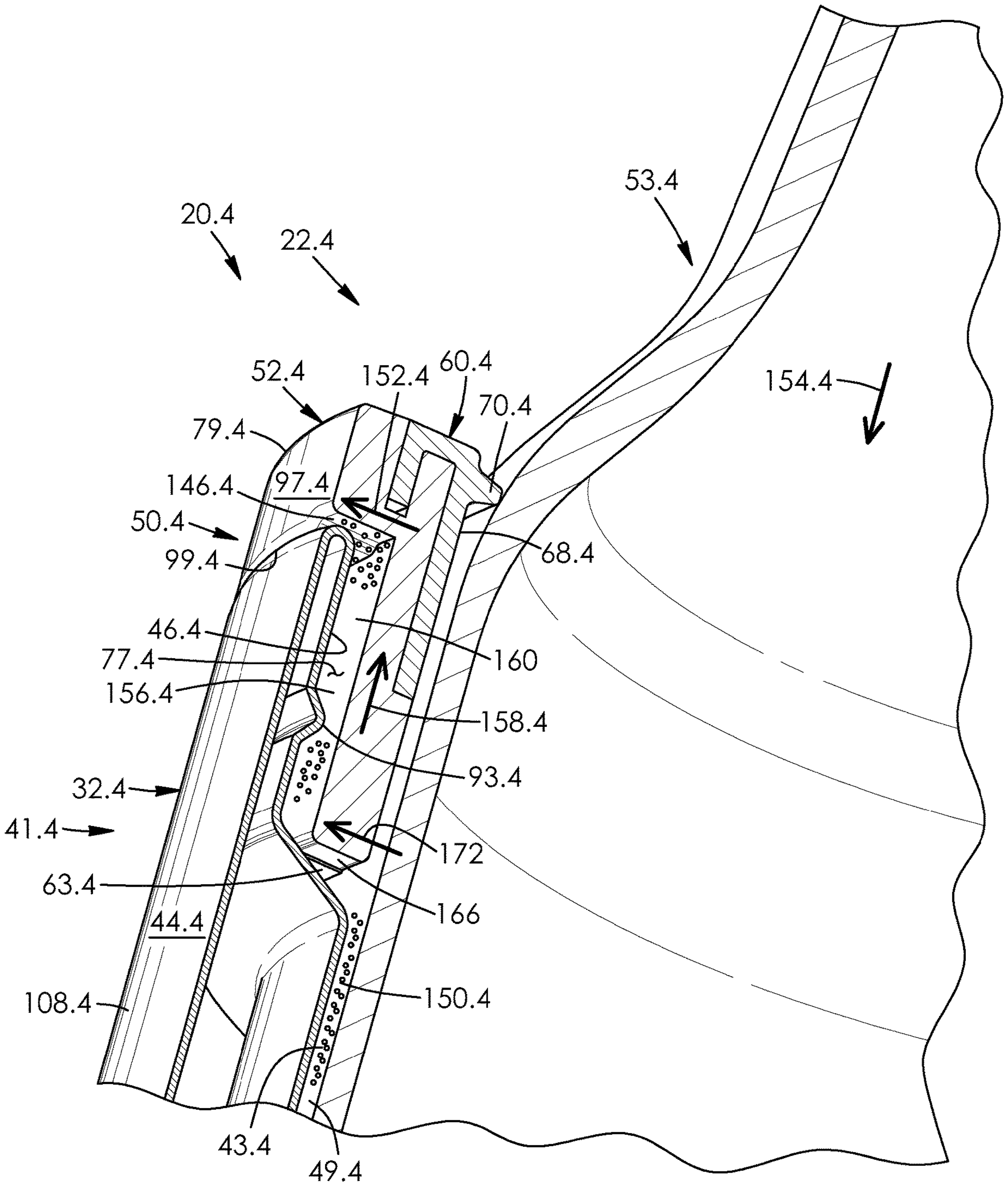
FIG. 27 is a front, bottom, sectional view of the beverage apparatus of FIG. 21, with the beverage holder thereof receiving a beverage therein, and with the beverage retaining assembly thereof coupling to the beverage holder and sealably engaging with the beverage, with the beverage apparatus and bottle being shown in fragment.

As seen in FIG. 27, the sleeve passageways 160 are in fluid communication with the interior 43.4 of the beverage holder 34.4. The sleeve passageways are in fluid communication with the flange passageways 146.4 and thus are in fluid communication the exterior 41.4 of the beverage apparatus 20.4.

As seen in FIG. 25, beverage retaining assembly 50.4 includes at least one and in this example, a plurality of lower passageways 166, 168 and 170. The lower passageways are circumferentially spaced-apart in this example. The lower passageways 166, 168, and 170 align with and are in fluid communication with sleeve passageways 160, 162 and 164. Each lower passageway comprises a recess or groove in this example; however, this is not strictly required and the lower passageways may comprise other shapes in other embodiments.

The lower passageways 166, 168 and 170 extend from outer annular surface 54.4 of the outer body 52.4 of the beverage retaining assembly 50.4 to inner peripheral peripheral surfaces, in this example inner annular surfaces 68.4 and 144.4 of the inner annular member 60.4 and outer annular member of the beverage retaining assembly. The lower passageways may thus be said to extend from the outer peripheral surface towards the inner peripheral surface of the beverage retaining assembly 50.4. The lower passageways 166, 168 and 170 extend axially from bottom 63.4 of the outer body 52.4 of the beverage retaining assembly 50.4 and bottom 39.4 of the beverage retaining assembly 50.4 towards the top 37.4 of the beverage retaining assembly.

Referring to FIG. 27, the lower passageways 166 are in fluid communication the interior 43.4 of the beverage holder 34.4. The lower passageways are in fluid communication with respective sleeve passageways 160 and are in fluid communication with respective flange passageways 146.4 thereby. Each lower passageway 166 is thus in fluid communication with the exterior 41.4 of the beverage apparatus 20.4.

Referring to FIG. 27, when a beverage, in this example beer bottle 53.4 is inserted into the beverage holder 34.4, as shown by arrow 154.4, lower passageways 166 are shaped to enable air 150.4 from the interior 43.3 of the beverage holder 34.3 to pass therethrough, as shown by arrow 172. The sleeve passageways 160 are shaped to receive therethrough the air passing through the lower passageways, as shown by arrow 158.4. The flange passageways 146.4 are shaped to receive therethrough the air passing through the sleeve passageways, as shown by arrow 152.4.

The beverage retainer assembly 50.3/50.4 as herein described may comprise a lid or gasket mechanism that provides beverage drinkers with the ability to tightly secure their bottle 53.3/53.4 to beverage holder 34.3/34.4, expel heat while retaining in cold temperature. The beverage retainer assembly may further comprising a system that promotes easy removal and insertion of beverages into the beverage apparatus 20.3/20.4.

It will be appreciated that many variations are possible within the scope of the invention described herein. For example, lip 88 may not strictly be required in other embodiments of the beverage apparatus.

Also other beverage retaining assemblies may be provided in other embodiments. These may include and are not limited to:

a. Tapered back threads 93/93.4, 95/95.4 without individual grooves, but rather a slightly elevated upper lid base that does not run completely flush with the beverage holder 34.3/34.4. For example, this may comprise a beverage apparatus with a beverage retaining assembly that when fully screwed into place is configured such that the annular flange 79.3/79.4 of the outer annular member 50.3/50.4 is positioned slightly above the top 36.3/36.4 of the beverage holder 34.3/34.4 b. A plurality of circumferentially spaced-apart grooves distributed similarly to the beverage apparatuses 20.3/20.4 as herein described.

c. One or more aperture extending along and radially outwards from the inner annular surface 68.3/68.4 of the annular member 60.3/60.4, with the one or more apertures being in fluid communication with the exterior 41.3/41.4 of the beverage apparatus 20.3/20.4.

Additional Description

Examples of beverage apparatuses have been described. The following is offered as further description.

The following set of clauses is offered as further description.

(1) A beverage apparatus comprising: a beverage holder; and a beverage opener coupled to the beverage holder, the beverage opener including a central portion and an annular member that extends about the central portion (2) The beverage apparatus of clause 1 wherein the beverage opener is shaped to wedge a bottle cap between the central portion and the annular member.

(3) The beverage apparatus of clause 1 wherein the central portion and the annular member form an annular channel shaped to receive in part a bottle cap.

(4) The beverage apparatus of any preceding clause wherein the beverage opener couples to a bottom of the beverage holder.

(5) The beverage apparatus of any preceding clause wherein the beverage opener couples to and is integrally formed with the beverage holder.

(6) The beverage apparatus of any preceding clause wherein the central portion of the beverage opener includes an outer wall which faces downwards and outwards.

(7) The beverage apparatus of any one of clauses 1 to 5 wherein the central portion of the beverage opener includes an outer wall which faces the annular member.

(8) The beverage apparatus of any preceding clause wherein the beverage holder has an outer surface and wherein the annular member of the beverage opener comprises a flange that extends inwards relative to the outer surface of the beverage holder.

(9) The beverage apparatus of any one of clauses 1 to 7 wherein the annular member of the beverage opener comprises a radially-inwardly extending flange.

(10) The beverage apparatus of any preceding clause further including a magnet disposed within the central portion of the beverage opener.

(11) The beverage apparatus of any one of clauses 1 to 9 wherein the central portion of the beverage opener is magnetic at least in part.

(12) The beverage apparatus of any one of clauses 1 to 3 wherein the beverage holder has a bottom, wherein the beverage opener couples to the bottom of the beverage holder and wherein the central portion of the beverage opener is spaced-apart below the bottom of the beverage holder.

(13) The beverage apparatus of any one of clauses 1 to 3 wherein the beverage holder has a bottom, and wherein the beverage apparatus further includes a chamber extending between the bottom of the beverage holder and the central portion of the beverage opener, the chamber being spaced-apart below the bottom of the beverage holder.

(14) The beverage apparatus of clause 1 wherein the beverage opener enables a bottle cap to be removed anywhere along a circumferential extent of the annular member.

(15) The beverage apparatus of any one of clauses 1 to 14 wherein the central portion of the beverage opener is frustoconical in shape.

(16) The beverage apparatus of any one of clauses 1 to 14 wherein the central portion of the beverage opener is cone shaped at least in part.

(17) The beverage apparatus of any one of clauses 1 to 14 wherein the central portion of the beverage opener is outwardly convex at least in part.

(18) The beverage apparatus of any one of clauses 1 to 14 wherein the central portion of the beverage opener is spherical at least in part.

(19) The beverage apparatus of any one of clauses 1 to 14 wherein the central portion of the beverage opener extends downwards and radially-inwards relative to an outer surface of the beverage holder.

(20) The beverage apparatus of any preceding clause wherein the central portion of the beverage opener is coaxial with and spaced-apart from the annular member.

(21) The beverage apparatus of any preceding clause wherein the annular member is L-shaped in cross-section.

(22) A beverage opener of any preceding clause.

(23) A beverage opener having a closed top and an open bottom, and comprising: an annular sleeve extending between the top and the bottom thereof; and an annular flange extending along the bottom thereof, the flange coupling to and radially-inwardly extending relative to the sleeve.

(24) The beverage opener of clause 23 wherein the top of the beverage holder extends radially-inwards and downwards towards the bottom of the beverage holder.

(25) A beverage apparatus comprising: a beverage holder having an interior shaped to at least partially receive therein a beverage; and a beverage retaining assembly coupled to an open top of the beverage holder, the beverage retaining assembly including an outer flange shaped to abut the open top, and the outer flange having one or more flange passageways shaped to enable air from the interior of the beverage holder to pass therethrough as the beverage is inserted into the beverage holder.

(26) The beverage apparatus of clause 25 wherein the beverage holder has a longitudinal axis and wherein the one or more flange passageways of the outer flange extend axially relative to said longitudinal axis.

(27) The beverage apparatus of clause 25 wherein the beverage holder has a longitudinal axis and wherein the one or more flange passageways of the outer flange extend radially-inwards relative to said longitudinal axis.

(28) The beverage apparatus of clause 25 wherein the one or more flange passageways are square shaped in lateral cross-section.

(29) The beverage apparatus of clause 25 wherein the one or more flange passageways are circumferentially spaced-apart and extend inwards from an outer peripheral surface of the beverage retaining assembly.

(30) The beverage apparatus of clause 25 wherein the beverage retaining assembly includes outer male threading, the beverage holder includes inner female threading, and the beverage retaining assembly threadably couples to the beverage holder via said threading.

(31) The beverage apparatus of clause 30 wherein the outer male threading and the inner female threading are spaced relative to each other to enable at least some air from the interior of the beverage holder to pass therethrough when the beverage is inserted into the beverage holder.

(32) The beverage apparatus of clause 30 wherein the outer male threading and the inner female threading are spaced to form an annular passageway therebetween, wherein the annular passageway is in fluid communication with the interior of the beverage holder, and wherein the one or more flange passageways are in fluid communication with the annular passageway.

(33) The beverage apparatus of clause 25 wherein the beverage retaining assembly has a bottom shaped to fit within the beverage holder and a top spaced-apart from the bottom thereof, wherein the outer flange abuts the open top of the beverage holder via a shoulder, and wherein the one or more flange passageways extend from the shoulder towards the top of the beverage retaining assembly.

(34) The beverage apparatus of clause 25 wherein the beverage apparatus has an exterior, wherein the beverage retaining assembly has a bottom, has a top, and includes a sleeve extending from the bottom thereof towards the top thereof, the sleeve includes one or more sleeve passageways extending from the bottom of the beverage retaining assembly towards the top of the beverage retaining assembly, the one or more sleeve passageways being outwardly spaced-apart from an inner peripheral surface of the beverage retaining assembly and being in fluid communication with the interior of the beverage holder and being in fluid communication the exterior of the beverage apparatus.

(35) The beverage apparatus of clause 34 wherein the one or more sleeve passageways are in fluid communication with the one or more flange passageways.

(36) The beverage apparatus of clause 34 wherein the one or more sleeve passageways are circumferentially spaced-apart.

(37) The beverage apparatus of clause 25 wherein the beverage apparatus has an exterior, wherein the beverage retaining assembly includes one or more lower passageways extending from an outer peripheral surface thereof to an inner peripheral surface thereof, the one or more lower passageways being in fluid communication the interior of the beverage holder and in fluid communication with the exterior of the beverage apparatus.

(38) The beverage apparatus of clause 37 wherein the one or more lower passageways extend from a bottom of the beverage retaining assembly towards a top of the beverage retaining assembly.

(39) The beverage apparatus of clause 37 wherein the one or more lower passageways are circumferentially spaced-apart.

(40) The beverage apparatus of clause 35 wherein the beverage retaining assembly includes one or more lower passageways extending from an outer peripheral surface thereof to the inner peripheral surface thereof, the one or more lower passageways being in fluid communication the interior of the beverage holder, being in fluid communication with respective said one or more sleeve passageways, and thus being in fluid communication with respective said one or more flange passageways.

(41) The beverage apparatus of any one of clauses 25 to 40, wherein each said passageway comprises a recess.

(42) The beverage apparatus of any one of clauses 25 to 41, wherein each said passageway comprises a groove.

(43) The beverage apparatus of clause 25 wherein the beverage retaining assembly includes one or more continuous, radially-inwardly extending seals shaped to sealably couple with the beverage so received at least in part within the beverage holder.

(44) A beverage apparatus comprising: a beverage holder having an interior shaped to at least partially receive therein a beverage; and a beverage retaining assembly coupled to an open top of the beverage holder, the beverage retaining assembly having a continuous inner peripheral surface and including a flange having one or more flange passageways shaped to enable air from the interior of the beverage holder to pass therethrough as the beverage is inserted into the beverage holder, the one or more flange passageways being spaced outwards from the continuous inner peripheral surface of the beverage retaining assembly.

(45) A beverage apparatus comprising: a beverage holder having an interior shaped to receive a beverage at least in part therein; and a beverage retaining assembly comprising a sleeve shaped to couple with an open top of the beverage holder and a flange coupling to and extending radially-outwards from the sleeve, the beverage retaining assembly being shaped to sealably couple with the beverage, and the flange abutting the open top of the beverage holder and having one or more passageways shaped to enable air from the interior of the beverage holder to exit therefrom.

(46) A beverage apparatus comprising: a beverage holder having an interior and an open top; and a beverage retaining assembly including a sleeve which couples to the beverage holder via said open top, a flange shaped to abut the open top, the flange having one or more passageways shaped to enable air from the interior of the beverage holder to exit therefrom, and an inwardly-extending continuous seal.

(47) A beverage retaining assembly of any one of clauses 25 to 46.

It will also be understood by someone skilled in the art that many of the details provided above are by way of example only and are not intended to limit the scope of the invention which is to be determined with reference to the following claims.

What is claimed is:

1. A beverage apparatus comprising:

a beverage holder having an interior; and a beverage retaining assembly coupled to the beverage holder, the beverage retaining assembly having an exterior, having an interior, and including an outer flange extending from the exterior towards the interior thereof, the outer flange having one or more flange passageways shaped to enable air from the interior of the beverage holder to exit therefrom as a beverage is inserted into the beverage holder, wherein the one or more flange passageways are circumferentially spaced-apart and extend inwards from an outer peripheral surface of the beverage retaining assembly.

2. A beverage apparatus comprising:

a beverage holder having an interior; and a beverage retaining assembly coupled to the beverage holder, the beverage retaining assembly having an exterior, having an interior, and including an outer flange extending from the exterior towards the interior thereof, the outer flange having one or more flange passageways shaped to enable air from the interior of the beverage holder to exit therefrom as a beverage is inserted into the beverage holder, wherein the beverage retaining assembly is shaped to both promote temperature retention within the interior of the beverage holder and facilitate removal of warm air from the beverage holder upon insertion of the beverage therewithin, and wherein the beverage holder is shaped to inhibit air flow therewithin upon the beverage being inserted therewithin.

3. A beverage apparatus comprising:

a beverage holder having an interior; and a beverage retaining assembly coupled to the beverage holder, the beverage retaining assembly having an exterior, having an interior, and including an outer flange extending from the exterior towards the interior thereof, the outer flange having one or more flange passageways shaped to enable air from the interior of the beverage holder to exit therefrom as a beverage is inserted into the beverage holder, wherein each said passageway comprises a recess or a groove.

4. The beverage apparatus as claimed in claim 3 wherein the beverage retaining assembly has a bottom shaped to fit within the beverage holder and a top spaced-apart from the bottom thereof, wherein the outer flange abuts an open top of the beverage holder via a shoulder, and wherein the one or more flange passageways extend from the shoulder towards the top of the beverage retaining assembly.

5. The beverage apparatus as claimed in claim 3 wherein the beverage retaining assembly threadably couples to the beverage holder via male and female threading which is spaced in part to form an annular passageway, the annular passageway being in fluid communication with the interior of the beverage holder, and the one or more flange passageways being in fluid communication with the annular passageway.

6. The beverage apparatus as claimed in claim 3 wherein the beverage apparatus has an exterior, wherein the beverage retaining assembly has a bottom, has a top, and includes a sleeve extending from the bottom thereof towards the top thereof, the sleeve including one or more sleeve passageways extending from the bottom of the beverage retaining assembly towards the top of the beverage retaining assembly, the one or more sleeve passageways being outwardly spaced-apart from an inner peripheral surface of the beverage retaining assembly, the one or more sleeve passageways being in fluid communication with the interior of the beverage holder, and the one or more sleeve passageways being in fluid communication with the exterior of the beverage apparatus.

7. The beverage apparatus of claim 6, wherein the one or more sleeve passageways are in fluid communication with the one or more flange passageways.

8. The beverage apparatus of claim 6, wherein the one or more sleeve passageways are circumferentially spaced-apart.

9. The beverage apparatus as claimed in claim 3 wherein the beverage apparatus has an exterior, wherein the beverage retaining assembly includes one or more lower passageways extending from an outer peripheral surface thereof to an inner peripheral surface thereof, the one or more lower passageways being in fluid communication with the interior of the beverage holder and in fluid communication with the exterior of the beverage apparatus.

10. The beverage apparatus of claim 3 wherein the one or more flange passageways are square shaped in lateral cross-section.

11. The beverage apparatus as claimed in claim 3, wherein the beverage retaining assembly has a continuous inner peripheral surface, the continuous inner peripheral surface being annular, and the one or more flange passageways being spaced outwards from the continuous inner peripheral surface.

12. The beverage apparatus as claimed in claim 3, wherein the beverage retaining assembly includes an inwardly-extending continuous seal, the inwardly-extending continuous seal being positioned to sealably couple to the beverage inserted into the beverage holder.

13. The beverage apparatus as claimed in claim 12, wherein the inwardly-extending continuous seal is trapezoidal in shape in lateral section.

14. A beverage apparatus according to claim 3, comprising a beverage opener coupled to the beverage holder, the beverage opener including a central portion and an annular member that extends about the central portion.

15. The beverage apparatus as claimed in claim 14 wherein the central portion of the beverage opener and the annular member of the beverage opener form an annular channel shaped to receive in part a bottle cap.

16. The beverage apparatus as claimed in claim 14 wherein the beverage opener couples to a bottom of the beverage holder.

17. The beverage apparatus as claimed in claim 14 wherein the annular member of the beverage opener is a radially-inwardly extending flange.

18. The beverage apparatus as claimed in claim 14 wherein the beverage opener is shaped to wedge a bottle cap between the central portion thereof and the annular member thereof.

19. The beverage apparatus as claimed in claim 14 wherein the beverage holder enables a bottle cap to be removed anywhere along a circumferential extent of the annular member of the beverage opener.

20. The beverage apparatus as claimed in claim 14 wherein the central portion of the beverage opener is at least one of frustoconical in shape, outwardly convex at least in part, and spherical at least in part.

* * * * *